United States Patent
Iwasaki

(10) Patent No.: US 7,200,293 B2
(45) Date of Patent: Apr. 3, 2007

(54) RECONFIGURABLE OPTOELECTRONIC CIRCUIT

(75) Inventor: Tatsuya Iwasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 10/530,188

(22) PCT Filed: Apr. 15, 2004

(86) PCT No.: PCT/JP2004/005413

§ 371 (c)(1),
(2), (4) Date: Apr. 4, 2005

(87) PCT Pub. No.: WO2004/093354

PCT Pub. Date: Oct. 28, 2004

(65) Prior Publication Data

US 2006/0120668 A1    Jun. 8, 2006

(30) Foreign Application Priority Data

Apr. 15, 2003 (JP) ............................. 2003-110242

(51) Int. Cl.
*G02B 6/12* (2006.01)
*G02B 6/02* (2006.01)

(52) U.S. Cl. .......................................... 385/14; 385/39

(58) Field of Classification Search ............. None
See application file for complete search history.

(56) References Cited

U.S. PATENT DOCUMENTS

| 5,684,980 A | 11/1997 | Casselman | 395/500 |
|---|---|---|---|
| 5,802,290 A | 9/1998 | Casselman | 395/200.1 |
| 6,016,211 A * | 1/2000 | Szymanski et al. | 398/1 |
| 6,023,755 A | 2/2000 | Casselman | 712/37 |
| 6,278,231 B1 | 8/2001 | Iwasaki et al. | 313/310 |
| 6,289,440 B1 * | 9/2001 | Casselman | 712/227 |
| 6,647,010 B1 | 11/2003 | Ford et al. | 370/391 |
| 6,838,297 B2 | 1/2005 | Iwasaki et al. | 438/20 |
| 6,982,974 B1 * | 1/2006 | Saleh et al. | 370/386 |
| 2002/0071151 A1 | 6/2002 | Zaacks et al. | 359/118 |
| 2002/0156998 A1 | 10/2002 | Casselman | 712/227 |
| 2005/0129348 A1 | 6/2005 | Iwasaki | 385/14 |

FOREIGN PATENT DOCUMENTS

| EP | 1 043 868 A2 | 10/2000 |
|---|---|---|
| EP | 1 213 944 A2 | 6/2002 |
| JP | 06-069490 | 11/1994 |
| JP | 07-183629 | 7/1995 |
| JP | 09-214073 | 8/1997 |
| JP | 10-341063 | 12/1998 |
| JP | 2000-311156 | 11/2000 |
| JP | 2002-247258 | 8/2002 |
| JP | 2002-277694 | 9/2002 |
| JP | 2002-286959 | 10/2002 |
| WO | 03/009125 | 1/2003 |

* cited by examiner

*Primary Examiner*—Kaveh Kianni
(74) *Attorney, Agent, or Firm*—Fitzpatrick Cella Harper & Scinto

(57) ABSTRACT

A reconfigurable optoelectronic circuit adapted to alter its internal configuration includes logic circuits, electric connections and optical connections. It comprises a plurality of logic blocks of electronic circuit and an optical circuit interconnecting them and both the internal configuration of each of the logic blocks and the optical interconnections of the logic blocks using the optical circuit are alterable.

4 Claims, 13 Drawing Sheets

RECONFIGURABLE OPTOELECTRONIC CIRCUIT

TECHNICAL FIELD

This invention relates to a reconfigurable optoelectronic circuit that comprises a mixture of electronic circuits and optical circuits and is adapted to change its internal circuit configuration (including logical functions, electric connections, optical connections and so on) with an enhanced level of freedom.

BACKGROUND ART

In recent years, personal computers, mobile phones and PDAs (personal digital assistants) have been required to selectively operate with a plurality of applications by switching from one to another in addition to be compact and lightweight and show a high processing speed. Meanwhile, control devices of robots are required to selectively operate with a plurality of control algorithms by switching from one to another on a real time basis. From this point of view, there is a strong demand for circuit boards carrying reconfigurable circuits, particularly those that allow the circuits to be reconfigured at high speed on a real time basis.

Examples of known reconfigurable circuits include FPGAs (field programmable gate arrays) and CPLDs (complex programmable logic devices). Multi-chip systems using an FPGA where chips are interconnected by electric bus wiring are also known (Japanese Patent Application Laid-Open No. 2000-311156). Additionally, improvements are required to known circuits of the type under consideration in terms of processing speed and circuit scale.

However, since a system disclosed in the above patent document is realized by connecting chips by electric bus wiring, it does not allow reconfiguration of the inter-chip connections with an enhanced degree of freedom.

DISCLOSURE OF THE INVENTION

In view of the above identified circumstances, the present invention provides a reconfigurable optoelectronic circuit adapted to alter (i.e. reconfigure) its internal configuration including logic circuits, electric connections and optical connections, comprising a plurality of logic blocks of electronic circuit and an optical circuit interconnecting them, wherein both the internal configuration of each of the logic blocks and the optical interconnections of the logic blocks using the optical circuit are alterable.

There can be a number of different modes of carrying out the invention that provides the above described basic arrangement.

Preferably, said optical circuit includes a sheet-shaped optical transmission medium and ports adapted to at least either transmit an optical signal to or receive an optical signal from the optical transmission medium, the inter-port optical connections being arranged so as to flexibly allow alterations.

Preferably, closely located ones of the logic blocks can be interconnected by electric wires.

Preferably, each of said logic blocks includes a plurality of logic elements and an electric connection network interconnecting the logic elements and at least either the internal configuration of at least one of the logic elements is or the interconnections of the logic elements are alterable. For example, each of the logic blocks may include logic elements whose functions are alterable and an electric connection network that can alter the interconnections of the logic elements.

Preferably, configuration data are distributed by way of said optical circuit and the internal configuration of any of the logic blocks is altered according to the configuration data. Alternatively, it may be so arranged that each of said logic blocks comprises a variable logic section and a memory section, and the memory section holds configuration data that corresponds to the internal configuration of the variable logic section. Then, it may be so arranged that said logic blocks can move, copy and/or replace the internal configuration of some other logic block by way of the optical circuit.

In another aspect of the invention, there is provided a hierarchically reconfigurable circuit, comprising a first stratum having a plurality of logic elements whose internal configurations are alterable, a second stratum containing logic blocks having electric wires and switches arranged in the form of a matrix and interconnecting the arranged logic elements and adapted to switch the interconnections of the logic elements and a third stratum having a sheet-shaped optical transmission medium for optically interconnecting the logic blocks and adapted to switch the interconnections of the logic blocks.

In still another aspect of the invention, there is provided an interconnection structure, comprising electric wires interconnecting logic elements, electric switches adapted to alter the interconnections of the logic elements, ports connected to the logic elements and adapted to perform opto-electric signal conversions and a means for altering optical interconnections of the ports by way of a sheet-shaped optical transmission medium.

A key feature of the present invention resides in that reconfigurable electronic circuits (realized typically by semiconductor chips) are hybridized with an (reconfigurable) optical circuit. The present invention provides a number of effects and advantages including at first that the problem of RC signal delay of electric wires and EMI of electronic circuits can be alleviated by applying an optical circuit (typically a flexible optical circuit described latter) with reconfigurable electronic circuits and hence it is possible to realize a large and complicated circuit that can be reconfigured at high speed.

More specifically, reconfigurable electronic circuits including FPGAs require the use of a large number of wires in order to enhance the freedom of wiring so that consequently a large portion of the die area needs to be assigned to programmable wires. Additionally, wires are arranged in the form of a matrix in many cases. Then, a large number of switches need to be provided along the wires to by turn give rise to a problem of wire delays. Furthermore, these tendencies become remarkable particularly when a large scale and high speed operation is required.

According to the present invention, the size and the area of each electronic circuit (chip) are not required to be raised (and rather can be reduced) as an optical circuit is introduced among the electronic circuits. Additionally, a substantially large system can be realized by interconnecting a plurality of electronic circuit by means of an optical circuit that operates at high speed. Furthermore, the interconnections among the electronic circuits can be altered with an enhanced degree of freedom by using a flexible optical circuit so that it is possible to reconfigure a large scale circuit comprising a plurality of electronic circuits.

Generally, it is difficult to make a large electronic circuit operate at high speed. However, according to the present invention, it is possible to realize a large scale circuit that operates at relatively high speed by interconnecting small and fast electronic circuits. The use of small-sized electronic circuits, which are inexpensive as compared to large ones, reduces the overall cost. Additionally, the overall circuit dimensions can be scalably increased by increasing the number of electronic circuits.

While the above cited Japanese Patent Application Laid-Open No. 2000-311156 discloses a technique of electrically connecting FPGAs. When compared with the above-identified invention, the present invention can improve the variety and the flexibility of connection by the use of an optical circuit and makes high speed information transmissions possible. Particularly, while the degree of freedom of the inter-chip electrical connection is reduced when the number of electronic circuits (chips) increases, the counterpart of a flexible optical circuit is remarkably high because it is adapted to complete connection and multicast transmissions, etc.

Additionally, it is difficult to reconfigure large electric systems with conventional inter-chip connections using electric wires typically in the form of matrix wiring. To the contrary, such reconfigurations can be realized relatively easily when optical free wiring is used. Particularly, wire arrangement and circuit design can be remarkably facilitated when an optical interconnection is used for long distance connection so that the overall circuit can be reconfigured with ease and the time necessary for the reconfiguration is reduced.

Thus, a large scale reconfigurable circuit that operates flexibly at high speed can be realized with ease by using an optoelectronic circuit, a hierarchically reconfigurable circuit and/or an interconnection structure according to the invention.

BEST MODE FOR CARRYING OUT THE INVENTION

Now, the present invention will be described in greater detail by referring to the accompanying drawings that illustrate preferred embodiments of optoelectronic circuit, hierarchically reconfigurable circuit and interconnection structure according to the invention.

Figure 1:
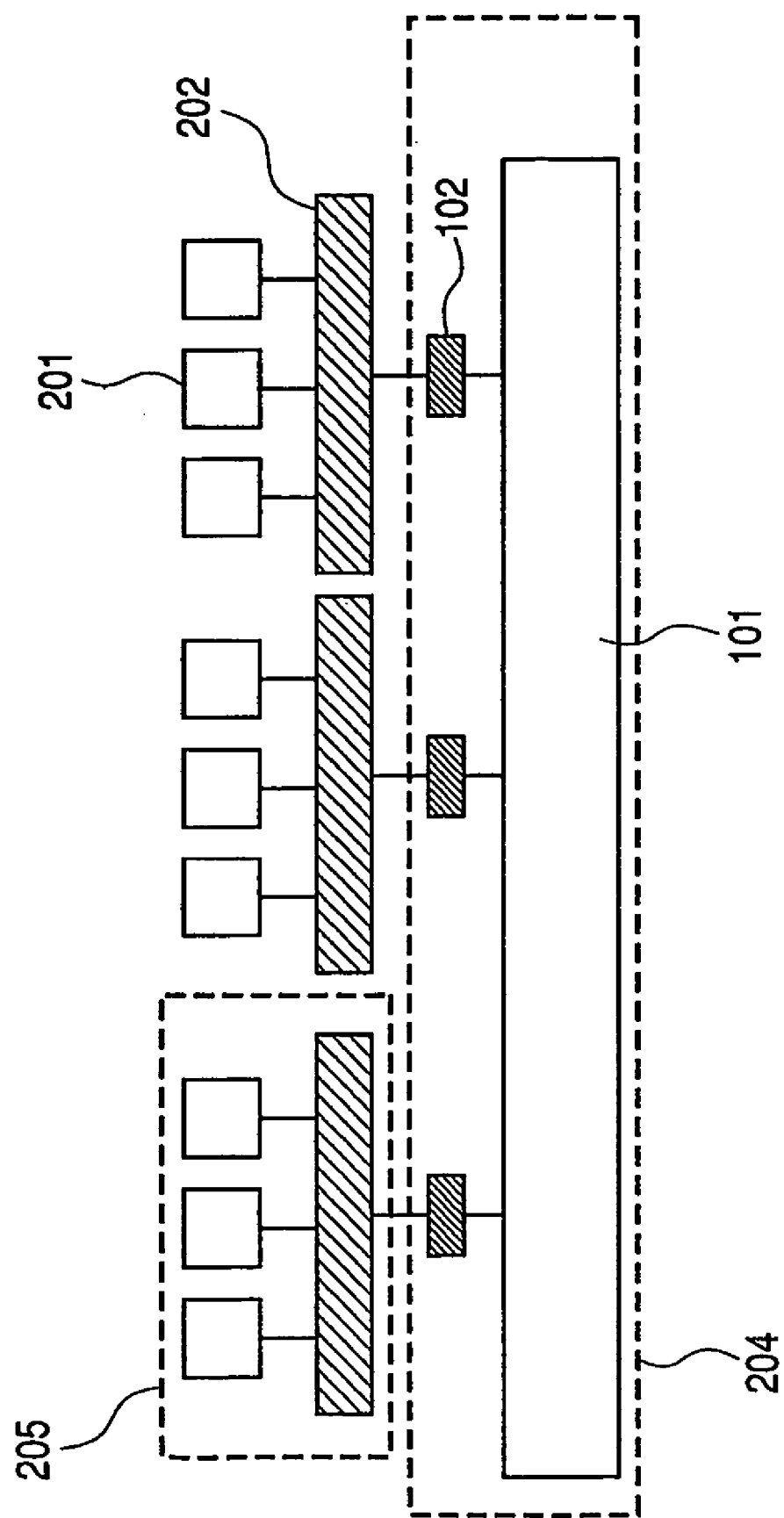
FIG. 1 is a schematic illustration of the principle of connection of a reconfigurable optoelectronic circuit according to the invention.

FIG. 1 is a schematic illustration of the circuit connection of an embodiment of reconfigurable optoelectronic circuit, hierarchically reconfigurable circuit and interconnection structure according to the invention. In FIG. 1, there are shown logic elements 201, electric connection networks 202, a flexible optical circuit 204, logic blocks 205, an optical transmission medium 101 and ports 102. Thus, this embodiment comprises a plurality of electronic circuits, or logic blocks 205, whose internal circuit configuration is reconfigurable and which are interconnected by a flexible optical circuit 204. Examples of reconfigurable electronic circuit that can be used for the purpose of the present invention typically include circuits comprising logic elements 201 whose logic functions can be altered and electric connection networks 202 adapted to alter the interconnection of the logic elements 201. In this letter of specification, a unit of electronic circuit whose internal configuration is alterable is referred to as logic block. As may be clear from the above description, a typical optoelectronic circuit according to the invention comprises a plurality of electronic circuits (logic blocks 205) and a flexible optical circuit 204 that interconnects them, wherein the internal configuration of each of the logic blocks is reconfigurable and the optical interconnections of the logic blocks can be altered with an enhanced degree of freedom.

The logic elements 201 may be LUTs (lookup tables) storing a truth value table for input/output relating to the logic function to be realized in the form of RAM and adapted to output an output signal for a combination of inputs. They may additionally comprise one or more than one AND circuits, NAND circuits, OR circuits, NOR circuits, XOR circuits, flip flop circuits, latch circuits, registers, inverters, multipliers or some other circuits or combinations of any of them. Further, they may comprise memories. Furthermore, they may also comprise an operation unit (processor) for integer operations, floating point operations, function operations and so on.

Figure 2:
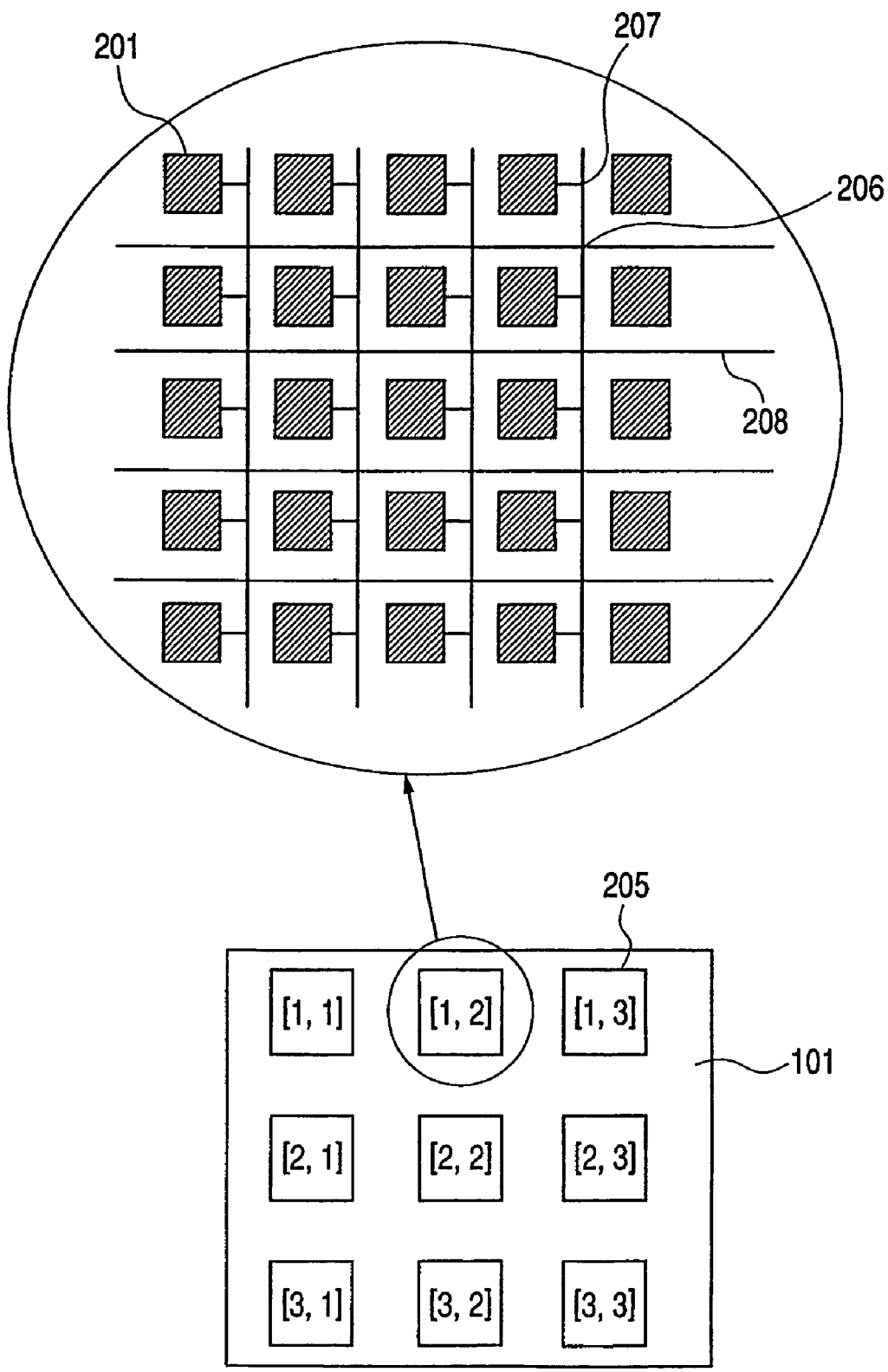
FIG. 2 is a schematic plan view of a reconfigurable optoelectronic circuit according to the invention, showing the configuration thereof.

The electric connection networks 202 are adapted to selectively define the interconnection of the logic elements. For example, an electric connection network 202 may comprise electric wires and switches arranged in the form of a matrix to interconnect the logic elements that are arranged as shown in FIG. 2. The switches are arranged at connecting sections 207 of logic elements 201 and electric wires and also at intersections 206 of wires 208 of the matrix wiring.

Thus, a typical logic block 205 may be defined as a reconfigurable electronic circuit in which reconfigurable logic elements 201 are interconnected by a reconfigurable electric connection network 202. The logic blocks 205 may include FPGAs, CPLDs and/or processor arrays formed by two-dimensionally arranging processors.

The flexible optical circuit 204 is a circuit adapted to transmit information, using light as carrier. It is a circuit that transmits information by way of an optical transmission medium 101 and can alter the form of transmission of information with an enhanced degree of freedom. The optical transmission medium may typically be a 2D (two-dimensional) optical waveguide. Due to the use of a flexible optical circuit 204, it is possible to alter the interconnection of any desired logic blocks 205 with an enhanced degree of freedom. Thus, an optoelectronic circuit according to the invention is adapted to alter the interconnection of any desired logic elements with an enhanced degree of freedom by altering the related electric connection network(s) and the optical circuit(s). In other words, the entire circuit configuration can be altered by altering not only the internal configuration of any of the electronic circuits (logic blocks) but also the optical interconnection of the selected electronic circuits (logic blocks) with an enhanced degree of freedom.

An optoelectronic circuit according to the invention may alternatively be embodied as a hierarchically reconfigurable circuit having three stratums adapted to reconfiguration as described below. The three stratums include a first stratum having reconfigurable logic elements (reconfiguration of logic elements), a second stratum having electric wires and switches arranged in the form of a matrix and interconnecting the arranged logic elements and adapted to alter the interconnection of any of the logic elements (reconfiguration at the level of the electric connection networks within the logic blocks) and a third stratum having an optical transmission medium in the form of a sheet or the like for optically interconnecting the logic blocks and adapted to switch any of the optical interconnections of the logic blocks (reconfiguration at the level of the flexible optical circuit).

Due to the use of such a hierarchical structure, it is possible to flexibly realize circuit alternations over a broad range, including small scale alterations using reconfigurations in the first stratum and large scale alterations involving those in the third stratum.

A circuit according to the invention may be understood as an interconnection structure where logic elements are interconnected by means of a connection structure comprising electric wires interconnecting logic elements, electric switches that can alter any of the interconnections of the logic elements, ports electrically connected to logic element so as to convert electric signals, a sheet-shaped optical transmission medium that allows optical interconnections of the ports and means for altering any of the optical interconnections of the ports.

FIG. 2 is a schematic illustration of the configuration of the above described embodiment of reconfigurable optoelectronic circuit. Referring to FIG. 2, there are shown logic elements 201, a matrix wiring 208 that is an electric connection network, logic blocks 205, an optical transmission medium 101, wire intersections 206 and connecting sections 207. It will be appreciated that FIG. 1 illustrates the interconnections of the components of the circuit, whereas FIG. 2 illustrates a two-dimensional layout of the components of the circuit.

Referring to FIG. 2, the reconfigurable circuit comprises a total of nine logic blocks 205. Each of the logic blocks 205 comprises twenty-five logic elements 201 and a matrix wiring 208 interconnecting the logic elements 201. However, the number of logic blocks 205 and that of logic elements 201 are not limited to those cited above and any desired numbers may be selected for the purpose of the invention. The logic elements 201 are interconnected by horizontal electric wires and vertical electric wires of the matrix wiring 208. Switches are arranged respectively at the intersections 206 of the horizontal electric wires and the vertical electric wires so as to alter any of the interconnections of the logic elements 201. Alternatively, switches may be arranged respectively at the connecting sections 207 of the logic elements 201 and the corresponding electric wires.

Said logic blocks 205 are connected to respective ports 102 (see FIG. 1) that are adapted to transmit optical signals to and/or receive optical signals from the optical transmission medium 101 (although the ports are not shown in FIG. 2). Each of the ports 102 comprises an optical output section (light emitting element) adapted to convert an electric signal into an optical signal and/or an optical input section (light receiving element) adapted to convert an optical signal into an electric signal, although it preferably comprises both an optical output section and an optical input section from the viewpoint of functionality. Thus, the signal from a logic block 205 is converted into an optical signal by the corresponding port 102 and propagated through the two-dimensional optical waveguide that is the optical transmission medium 101. Then, it is converted into an electric signal by a different port 102 to establish an optical circuit. In other words, light emitted from the light emitting element, or the optical output section, of a signal transmitting port 102 is propagated through the optical transmission medium 101 and input to the light receiving element, or the optical input section, of a signal receiving port 102. As the signal is converted into an electric signal by the signal receiving port 102, the signal is transmitted from the former port 102 to the latter port 102 to establish an optical circuit.

Figure 13A:
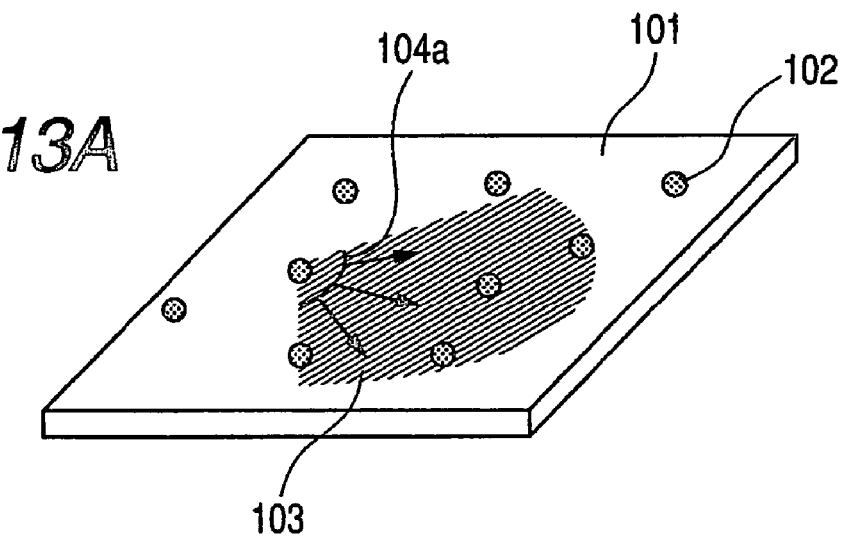
FIGS. 13A and 13B are schematic exemplar illustrations of propagation of light in a two-dimensional optical waveguide.
Figure 13B:
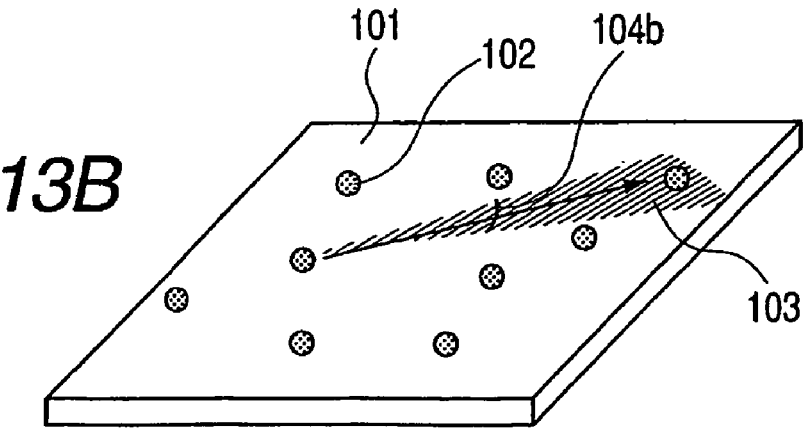

The optical transmission medium 101 is typically a two-dimensional optical waveguide (a sheet-shaped optical waveguide). A typical flexible optical circuit refers to a two-dimensional optical waveguide that allows any desired optical devices to be arranged respectively at any desired positions thereof so that optical data may be two-dimensionally transmitted from a port arranged at a desired position to another port arranged at another desired position. For example, as shown in FIGS. 13A and 13B, the destination of signal transmission can be selected in a desired manner by making light 103 to be propagated from a port 102 with a sense of propagation and an angle of radiation of light 104a or 104b that are predefined appropriately. Although the predefinable range of radiation angle 104 is not limited, it is possible to select 360° for broadcasting light in all directions or select a small angle so as to make light to be emitted in the form of a beam from a light emitting element with a small radiation angle, which may correspond to the radiation angle of the light emitting element. Thus, the entire circuit can be altered with an enhanced degree of freedom by controlling the sense of propagation of light and the angle of radiation of light. With regard to one to one connection/combination of ports, the flexible optical circuit can combine any ports for bidirectional communications. In other words, it is a circuit adapted to complete connection. It is a circuit with an enhanced degree of freedom for connection that is capable of realizing 1:N multicast communications and N:M communications.

Additionally, the flexible optical circuit can switch and reconfigure the above described connections. More specifically, it can switch (reconfigure) a one to one combination of ports and also switch (reconfigure) any of the transmission paths among a plurality of ports including 1:N and N:M transmission paths.

In this way, the flexible optical circuit that comprises a two-dimensional optical waveguide is adapted to complete connection of ports and reconfiguration for multicast communications and has an enhanced degree of freedom for connectivity. Thus, it is a preferable reconfigurable system that interconnects reconfigurable electronic circuits by a reconfigurable optical circuit with an enhanced degree of freedom for interconnection.

Then, it is possible to smoothly reconfigure an optoelectronic circuit over a plurality of electronic circuits (chips) interconnected by way of a flexible optical circuit. Therefore, it is possible to reduce long distance electrical wirings in logic blocks and alleviate the problem of signal delays within electronic circuits. Furthermore, it realizes a large and fast system using small electronic circuits (chips). Additionally, it is possible for an optical circuit comprising a two-dimensional optical waveguide to expand system size in a scalable manner by adding logic blocks.

Moreover, the use of a reconfigurable optical circuit with a two-dimensionally enhanced degree of freedom for interconnection as described above is highly preferable from the viewpoint of easiness of designing particularly when expanding electronic circuits (logic blocks), each comprising two-dimensionally arranged logic elements. In other words, the hybridization of a two-dimensional flexible optical circuit and electronic circuits is very advantageous particularly in terms of applicability and adaptability.

While square logic blocks 205 are arranged regularly in FIG. 2, the profile of the electronic circuits that can be used for the purpose of the present invention is by no means limited thereto. The electronic circuits may have a rectangular profile and may be arranged in any different way. Particularly, ports may be arranged at any desired positions of a two-dimensional flexible optical circuit. In other words, an optoelectronic circuit comprising a two-dimensional flexible optical circuit is characterized by providing an advantage of an enhanced degree of freedom for arranging chips (electronic circuits).

Typically, each logic block may be connected with a port, although each logic block may alternatively be provided with a plurality of ports. Still alternatively, a plurality of logic blocks may share a single port.

While FIG. 2 shows a homogeneous reconfigurable system comprising only logic blocks 205, a reconfigurable optoelectronic circuit according to the invention may additionally comprises chips, which may be one or more than one ASICs, CPUs, DSPs and/or memories. Then, ports connected to chips such as ASICs may be provided.

Not a line waveguide or free space optical connection but a two-dimensional optical waveguide is preferably used for a flexible optical circuit according to the invention as will be discussed below. Firstly, the use of an optical circuit using optical fibers and/or a line waveguide may be conceivable. Then, however, fixed line wiring is required for such an arrangement at the cost of freedom of wiring. Additionally, there may be difficulties including provision of a large number of optical switches when such an optical circuit is to be reconfigured. Furthermore, a linear optical waveguide has a dimension of several microns to tens of several microns and alignment of the optical axis of such an optical waveguide is highly difficult. Still additionally, micro-processing are required to fabricate such an optical waveguide.

On the other hand, the use of a two-dimensional optical waveguide allows optical devices (including light emitting elements and light receiving elements) to be mounted at desired positions. In other words, it is possible to transmit information between any desired positions. Additionally, optical devices and an optical waveguide layer can be optically aligned with ease when optically coupling them. Because of such simplicity of arrangement, a circuit board can be prepared with ease to reduce the cost. Still additionally, as will be discussed hereinafter, with a flexible optical circuit comprising a two-dimensional optical waveguide, optical circuits can be reconfigured basically only by controlling the ports thereof that are optical input/output sections.

While a system adapted to allow light to be propagated in a free space is accompanied by a problem of large dimensions, although it provides an enhanced degree of interconnection freedom, the use of a flexible optical circuit comprising a two-dimensional optical waveguide allows to realize a circuit board on which circuits can be mounted to show a low profile and high density.

Now, a method of altering the circuit configuration of a reconfigurable optoelectronic circuit according to the invention will be described below. As pointed out above, the circuit can be reconfigured in any of the three stratums.

The three stratums refer to the level of the logic elements, that of the electric connection networks within the logic blocks and that of the flexible optical circuit. Basically, an optoelectronic circuit according to the invention can be reconfigured repeatedly without any limit. The circuit can be reconfigured entirely or partly. Data to be used for reconfiguration are referred to as configuration data (configurable data). The circuit configuration is altered according to the configuration data. The configuration data are stored in the inside of the optoelectronic circuit or in an external memory device and an operation of reconfiguration is conducted by reading out the configuration data whenever necessary. Either electric wires or the flexible optical circuit may be used for loading the configuration data, although the use of the flexible optical circuit is advantageous from the viewpoint of exploiting the features of an optoelectronic circuit according to the invention.

A reconfiguration at the first stratum, or the level of the logic elements, is realized by altering the internal configuration of any of the logic elements to select and/or alter the function of the related logic element(s). A logic element can be electrically redefined so as to be provided with one of a plurality of logic functions. For example, an LUT can be redefined or rewritten into a logic circuit having a truth value table of a specific logic function by inputting a specific signal to the LUT. For example, an LUT can realize wide range logic functions with about 2 to 6 inputs.

When an ALU (arithmetic and logic unit) is used as logic element, its function can be defined by means of an instruction set to be input. ALUs of a plurality of different types may be provided so that a desired ALU may be selectively used. For example, ALUs of the integer type, those of the floating point type and those with different numbers of bits may be arranged. A reconfiguration technique using part of the configuration data as control signals for a multiplexer or a selector may also be used for the purpose of the invention.

All the logic elements may be reconfigured. Alternatively, only some of the logic elements may be reconfigured. If the net result is same, the latter partial reconfiguration is preferable because the reconfiguring operation can be carried out more quickly when only part of the logic elements are involved in reconfiguration. A memory such as SRAM may be provided inside or near each logic element so as to store configuration data there. It will be appreciated that an optoelectronic circuit adapted to reconfiguration of only the second and third stratums and hence not adapted to reconfiguration of the first stratum (all or part of the logic elements) also falls within the scope of the present invention.

The second stratum at the level of the electric connection networks is reconfigured by switching all or some of the switches arranged at the sections connecting the logic elements and the matrix wiring and also at the intersections of wires of the matrix wiring to redefine the routing of the electric connection network(s) (see FIG. 2). The interconnections of the logic elements can be altered and redefined by turning the switches on/off, using part of the configuration data. The switches at the intersections can be turned on/off typically by controlling the gates of the pass transistors. In this way, a logic element is connected to another logic element by way of a horizontal electric wire, a vertical electric wire and a switch. A horizontal electric wire and a vertical electric wire can be connected to each other by way of a logic element.

In this way, the logic function of each logic element and the interconnection of any two logic elements can be reconfigured according to the configuration data. Then, a logic block can be reconfigured by rewriting the configuration data in the logic block. For the purpose of the present invention, a logic block can typically be defined as an electronic circuit whose internal configuration can be reconfigured by altering the logic function of each of the logic elements and the interconnections of the logic elements. Each logic block may be provided with a memory such as SRAM for storing the configuration data in the inside. Memories that can be used for the purpose of the invention include flash memories, EEPROMs, DRAMs, SRAMs, MRAMs and Fe-RAMs.

The function of a reconfigurable circuit according to the invention is defined by specifying the interconnections of the logic blocks as described below in addition to the logic function of each of the logic elements and the interconnections of the logic elements.

The third stratum at the level of the flexible optical circuit can be reconfigured by controlling the optical outputs from the port connected to a logic block and/or classifying the optical inputs to the ports. The interconnections of the logic blocks can be defined and altered by controlling the connections of the flexible optical circuit, using part of the configuration data for specifying the definition and the alteration.

As pointed out above, the circuit connections can be altered (reconfigured) by altering the sense of propagation and the angle of radiation of the light signal from the signal transmitting port to select the destination of the signal. It is also possible to alter the direction in which the optical signal is received. It is also possible to reconfigure the circuit by selecting data at the signal receiving port. For example, it is possible to transmit information to a desired signal receiving port by an arrangement where the signal transmitting port transmits the information by broadcast as packet signals to which addresses are attached and the signal receiving port selects the right address. Thus, a flexible optical circuit is a circuit that can intrinsically realize bidirectional complete coupling of ports.

While logic blocks can be optically interconnected, specific logic blocks such as those that are located close to each other may alternatively be interconnected directly by electric wiring. However, it should be noted that logic blocks that are remote from each other are preferably interconnected by optical wiring. It may be so arranged that optical wiring and electric wiring can freely and selectively be used.

Due to the provision of the third stratum, logic blocks can be connected to other logic blocks by way of the flexible optical circuit with an enhanced degree of interconnection freedom. Thus, as a result, it is possible to realize a large reconfigurable circuit that can be reconfigured over a plurality of logic blocks.

By applying the hierarchical structure of the first, second and third stratums, logic elements and logic blocks can be interconnected in a highly flexible way according to configuration data.

One or more than one stratums may be added to the above three stratums. For example, a stratum of electric connection networks of a different form may be arranged between the second and third stratums. Then, corresponding relationship between the logic blocks and the ports can be altered by reconfiguring the electric connection networks. Networks of optical fiber may be provided as fourth stratum. The advantages of providing the above three stratums can be fully exploited when a fourth stratum is added.

An additional control circuit may be provided for the purpose of inputting/outputting and/or transferring configuration data and/or issuing commands for reconfiguration. The control circuit may be assigned to some of the logic blocks. The use of the flexible optical circuit for transferring configuration data to logic blocks is preferable because it allows a quick reconfiguration. Then, a reconfiguration can be realized dynamically on a real time basis. The circuit can be reconfigured optimally to make it currently most suitable for the processing operation to be performed at high speed by frequently reconfiguring logic blocks.

Figure 3:
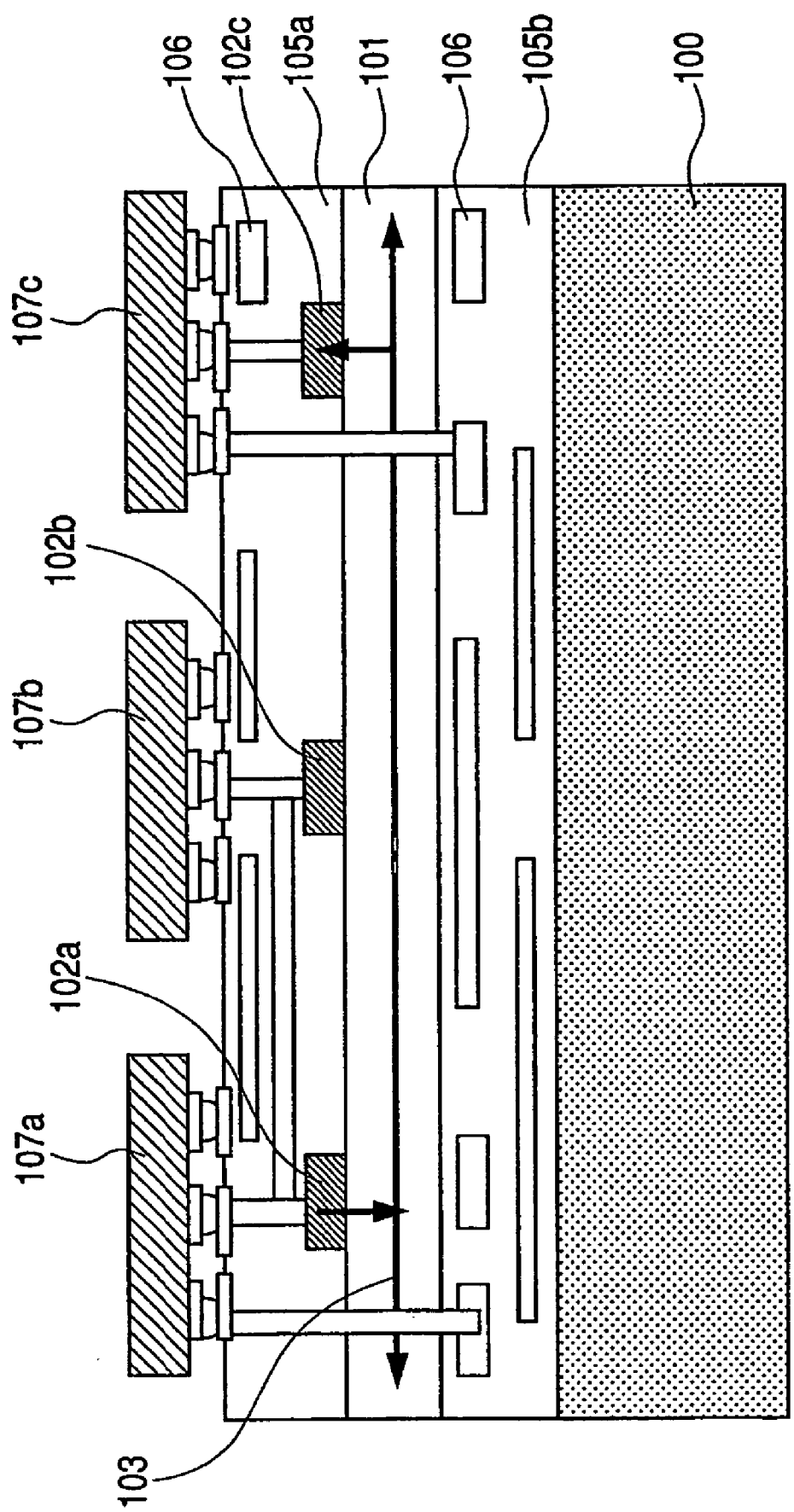
FIG. 3 is a schematic cross sectional view of a reconfigurable optoelectronic circuit according to the invention, showing the configuration thereof.

FIG. 3 is a schematic cross sectional view of an embodiment of optoelectronic circuit according to the invention. In FIG. 3, there are shown electric wiring layers 105, electric wires 106 and electronic devices (chips) 107 that are logic blocks. As shown in FIG. 3, reconfigurable electronic devices 107 and an optical circuit comprising a two-dimensional waveguide as optical transmission medium 101 coexists in the circuit board. Additionally, the electric wiring layers 105 comprising electric wires 106 that interconnect the chips 107 are laid to realize a compact assembly. The flexible optical circuit is so configured that a signal from one of the electronic devices 107 is converted into an optical signal at the corresponding port 102 and, after being propagated through the optical transmission medium 101, the optical signal is converted into an electric signal by some other port 102.

While FIG. 3 is a schematic cross sectional view of a circuit comprising three chips 107a through 107c and three ports 102a through 102c, any number of logic blocks (chips) and any number of ports may be arranged on a same plane as shown in the plan view of FIG. 2. While the ports 102 are arranged on the optical transmission medium 101 in direct contact with the latter, the arrangement of the ports 102 is by no means limited thereto. Alternatively, the ports may be buried in the optical transmission medium 101 so as to directly couple light to the waveguide or arranged on an end facet of the optical transmission medium 101.

The optical transmission medium 101 may be made of any appropriate material selected from glass, semiconductor or an organic material so long as it transmits propagating light 103 with a sufficiently high transmittance. For example, a commercially available glass substrate, a single crystal substrate of lithium niobate, a semiconductor substrate of Si or GaAs or an organic sheet of polycarbonate, acryl, polyimide or polyethylene terephthalate may be used without any further treatment. Techniques that can be used for preparing the optical transmission medium 101 include vacuum evaporation, dipping and application as well as molding such as injection molding and extrusion molding. A clad layer may be formed by coating the substrate with a layer showing a different refractive index. The size of the optical transmission medium 101 is typically between about 100 microns and tens of several centimeters in view of the fact that information is transmitted between two-dimensionally arranged desired positions, although it may depend on the data transfer rate. The thickness of the optical transmission medium 101 is typically between 1 micron and several centimeters, although it is preferably between 50 microns and several millimeters from the viewpoint of easiness of alignment of the optical axis of the optical waveguide.

The optical output section of each port 102 is adapted to propagate light 103 on the plane of the two-dimensional optical waveguide with an appropriate radiation angle. On the other hand, it can propagate in a multiple mode or single mode, although either mode may be used for the purpose of the invention.

While light emitting elements that can be used for the optical output section of a port 102 include laser diodes and LEDs, the use of a surface emitting laser having a small angle of light emission is preferable from the viewpoint of realizing propagation of light with a small radiation angle. The optical output section of a port 102 may be provided with a means for switching the radiation angle and the direction of emission. With such an arrangement, the two-dimensional optical waveguide 101 can make the ports 102 emit light so as to propagate it in different directions with different radiation angles in a switched manner. As means for switching the radiation angle and the direction of emission, each port 102 may be provided with a plurality of optical output sections so as to be able to emit light in different directions with different radiation angles and a specific direction of emission of light and a specific radiation angle may be selected by electrically selecting an optical output section to be used for signal transmission. For example, a plurality of light emitting elements may be arranged in array and different radiation angles and different directions of light emission may be discerned and defined for each of the elements of the array so that one of the directions and one of the radiation angles may selectively be used. Then, the radiation angle and the direction of light emission can be discerned and defined by selecting one of the light emitting elements of the array.

Furthermore, devices that are adapted to control the radiation angle and the direction of light emission can be used as light emitting elements for the optical output sections of the ports. The radiation angle and the direction of light emission can be altered by making the mode of coupling the light emitting elements that are used for the optical output sections and the two-dimensional optical waveguide 101 variable. More specifically, such an alteration can be realized by moving the optical coupling section arranged in the vicinity of the light emitting element in question, which may be a mirror, a prism, a lens or a grating. A similar effect can be obtained by moving the light emitting element itself or by modulating the optical properties including the refractive index of the material of the optical coupling section. A movable optical coupling section can be realized by forming a movable micro-mirror, employing an electrostatic force element, a magnetic force element or a piezoelectric element and the micro-mechanics technology.

On the other hand, the optical input section of a port 102 is preferably adapted to receive light over all directions of 360° of the two-dimensional optical waveguide 101. This arrangement provides an advantage that all the optical input sections can be made to have a same and simple configuration. Of course, each of the optical input sections may be so arranged that it can receive light only in a predetermined direction relative to the two-dimensional optical waveguide. Light receiving elements that can be used for the optical input sections include PIN photodiodes and MSM photodiodes. An optical coupler can also be applied to the optical input section. From the above described point of view, the use of a conical or spherical mirror is preferable for the optical coupler to be applied to the optical input section because light is preferably received in any direction over intra-planar 360 degrees.

A plurality of light receiving sections arranged in array may be used for a port 102. Particularly, the light receiving sections may be arranged in such a way that the elements of the array are adapted to receive incident light in different respective directions. Then, the direction in which light strikes the port 102 can be discerned by selecting a light receiving section out of the array.

The optical transmission medium 101 can be arranged on any appropriate substrate 100. A printed substrate, a metal substrate of aluminum or SUS, a semiconductor substrate of Si or GaAs, an insulating substrate of glass or some other material, a resin-made substrate or sheet of PMMA, polyimide or polycarbonate may be used for the substrate 100.

The electric wires 106 are metal wires of aluminum or copper. They can be prepared by vacuum evaporation or by using a technique of forming them from electrically conductive paste by screen printing. Alternatively, a technique of laying metal foils such as electrolytic copper foils to form a multilayer and chemically etching the metal foils, using etching resist in the form of a desired pattern, to produce a circuit conductor pattern may be used. While the optoelectronic circuit of FIG. 3 has only a single layer of optical transmission medium 101, it may alternatively have a plurality of layers of optical transmission medium 101.

As described above by way of embodiments, an optoelectronic circuit board according to the invention is adapted to alter the configuration of the electronic devices (logic blocks) and that of the optical circuits. In other words, an optoelectronic circuit according to the invention can be reconfigured in a highly reliable and flexible way. Additionally, a circuit substrate having an optical transmission medium as described above provides an enhanced degree of design freedom and is highly adapted to reconfiguration. Also, such a circuit substrate can handle a large volume of information at high speed and is highly resistive against electromagnetic radiation noises.

Now, the present invention will be described further by way of specific examples. However, it should be noted that the present invention is by no means limited to the examples that are described below particularly in terms of configuration and manufacturing process and any variations thereof that are found within the above described concept are also within the scope of the present invention.

EXAMPLE 1

An optoelectronic circuit or a circuit board similar to those illustrated in FIGS. 2 and 3 is prepared in Example 1. As shown in FIG. 3, the reconfigurable optoelectronic circuit of this example comprises an optical transmission medium 101 of a two-dimensional optical waveguide, ports 102, electric wiring layers 105 containing electric wires 106 and semiconductor chips 107 having reconfigurable electronic circuits. To be more accurate, the optical transmission medium 101 is sandwiched between a pair of electric wiring layers 105a, 105b in this example. The ports 102 are arranged near the interface of the electric wiring layer 105a and the optical transmission medium 101. The size of the substrate 100 is 3 cm square. A total of nine semiconductor chips 107 ([1, 1] through [3, 3]) that correspond to the logic blocks 205 shown in the plan view of FIG. 2 are arranged. Each of the semiconductor chips 107 is connected to a port 102.

The optical transmission medium 101 is formed by a two-dimensional optical waveguide that is produced by coating a 100 µm thick piece of polycarbonate (refractive index: 1.59) with clad layers of fluorinated polyimide (refractive index: about 1.52). The optical transmission medium 101 is bonded to the electric wiring layers 105 that is mounted with electric devices 107 to produce a highly densely mounted optoelectronic multilayer substrate as shown in FIG. 3.

The electric signal (CMOS logic or the like) of each semiconductor chip 107 can be transmitted by way of the corresponding port 102 and the optical transmission medium 101 as optical signal. It is also possible to transmit an electric signal to a nearby semiconductor chip 107 by way of the related electric wire 106. Either transmission of an optical signal or that of an electric signal can be selected depending on the circumstances. The logic signal (e.g., 3.3V in the case of a CMOS) of the semiconductor chip 107 is a voltage that is sufficiently high for driving the light emitting element of the port 102. The electric signal is converted into an optical signal as a forwardly biasing logic signal to the light emitting element of the port 102 by applying the logic signal. A 0.85 µm band surface emission laser VCSEL) is used for the light emitting element. The characteristics of the individual VCSELs include a drive current of 3.0 mA and an optical output level of 3 mW. Light emitted from the light emitting element is propagated through the optical transmission medium 101 with a predetermined radiation angle.

Figure 14A:
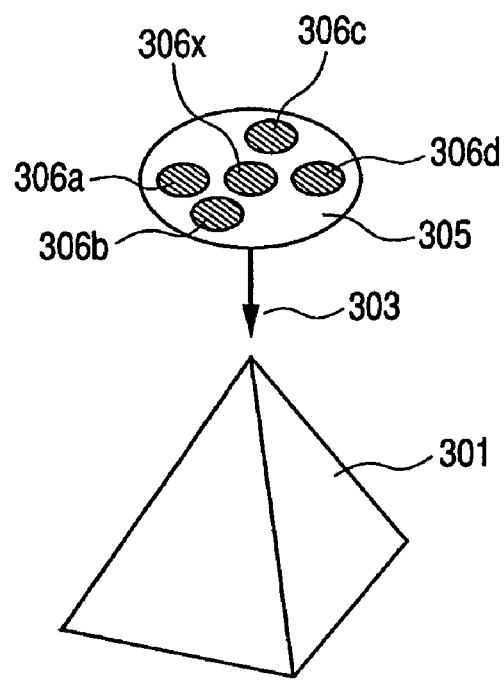
FIGS. 14A, 14B and 14C are schematic illustrations of examples of optical coupling section of port.
Figure 14B:
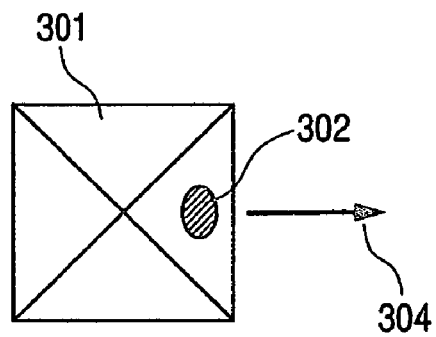
Figure 14C:
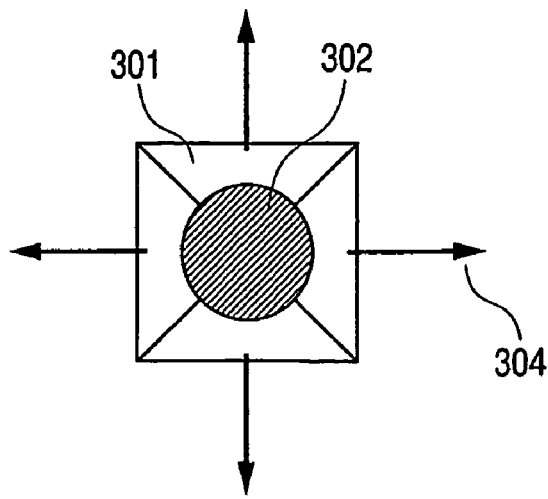

The ports 102 of this example are formed so as to provide different radiation angles and different directions of light emission for propagation. For this purpose, mirrors having a profile of a quadrangular pyramid as shown in FIG. 14A are used as optical couplers 301. Light 303 from one of the light emitting elements 306 is irradiated to the pyramidal mirror 301 from above and reflected transversally before it is coupled to the optical transmission medium 101. When light 303 is irradiated onto one of the slanting surfaces of the pyramidal mirror 301 (position 302 of light irradiation) from one of the light emitting elements as shown in FIG. 14B, light 304 propagating with a radiation angle of about 90° is produced. When, on the other hand, light is irradiated on the four slanting surfaces of the pyramidal mirror 301 (position 302 of light irradiation) as shown in FIG. 14C, light 304 propagating with a radiation angle of 360° is produced. When light 303 is irradiated onto two or three slanting slopes of the pyramidal mirror 301, a radiation angle of 180° or 270°, whichever appropriate, is produced. Uniform light is propagated through the entire range of the radiation angle because the slanting surfaces are diffusing surfaces.

A light output section 305 is formed by arranging a total of five light emitting elements 306a, 306b, 306c, 306d and 306x, the former four corresponding to the four slanting surfaces and the remaining one corresponding to the center of the pyramidal mirror, above the pyramidal mirror 301 so that light from each of the devices strikes the corresponding slanting surface. With this arrangement, the radiation angle can be defined by selecting one or more than one of the light emitting elements. Light is propagated in all directions of 360° when the light emitting element 306x at the center is used and in the direction of predefined 90° when one of the light emitting elements 306a through 306d is selected, whereas light is propagated in the directions of predefined 180° when two of the light emitting elements are selected and in the directions of predefined when three of the light emitting elements are selected. Finally, light is propagated in all directions of 360° when all the four light emitting elements 306a through 306d are selected.

In this example, the radiation angle and the direction of light emission can be switched by arranging a plurality of light emitting elements in the port 102 and selecting the light emitting element(s) to be driven. Then, the flexible optical circuit is reconfigured according to configuration data.

The optical signal propagated through the optical transmission medium 101 is then taken up by the light receiving element of the target port 102 and converted into an electric signal. An Si-PIN photodiode is used for the light receiving element and connected to the related electronic circuit 107. The electric signal obtained by the conversion is taken into the inside of the LSI located in the vicinity as input electric signal and then processed. The original CMOS-compatible voltage can be restored when a preamp is integrally arranged with the light receiving element for the purpose of amplifying the electric signal. The light receiving section can receive light in all directions of 360° of the two-dimensional optical waveguide 101 when a conical optical coupling section is used. In this way, the ports 102 can be freely connected by way of the optical transmission medium 101 and the data transfer rate between the ports 102 is maximally 1 Gbps and typically 500 Mbps.

Each of the semiconductor chips 107, or the logic blocks, comprises logic elements, each having a 4-input LUT and a flip flop, arranged in the form of a matrix. The number of logic elements in each logic block is about 50 thousands (although only 5×5 logic elements are shown in FIG. 2 for the purpose of simplicity). The electronic circuit 107 can be reconfigured by switching the logic function of the LUTs, the switches at the connecting sections of the logic elements and the wires and also the switches at the intersections of wires of the matrix wiring. The size of the chip 107 is 0.6 cm square and the operation frequency is 200 MHz.

When the optoelectronic circuit of this example is driven to operate, an optical circuit is formed between the selected two ports 102 and it was confirmed that the circuit operates in the desired manner. The electronic circuits 107 in the semiconductor chips can be reconfigured and the connections of the flexible optical circuit can be altered (reconfigured) by externally reading configuration data. In other words, it is confirmed that the optical circuit comprising means for switching the radiation angle and the direction of light emission can be reconfigured according to configuration data with an enhanced degree of freedom. Any desired ports 102 can be connected to each other in the flexible optical circuit and it is possible to realize a desired multicast transmission. Thus, a large scale and high-speed operating circuit can be reconfigured with an enhanced degree of freedom by reconfiguring the optical circuit and also electrically reconfiguring the semiconductor chips in a combined manner.

EXAMPLE 2

Figure 4:
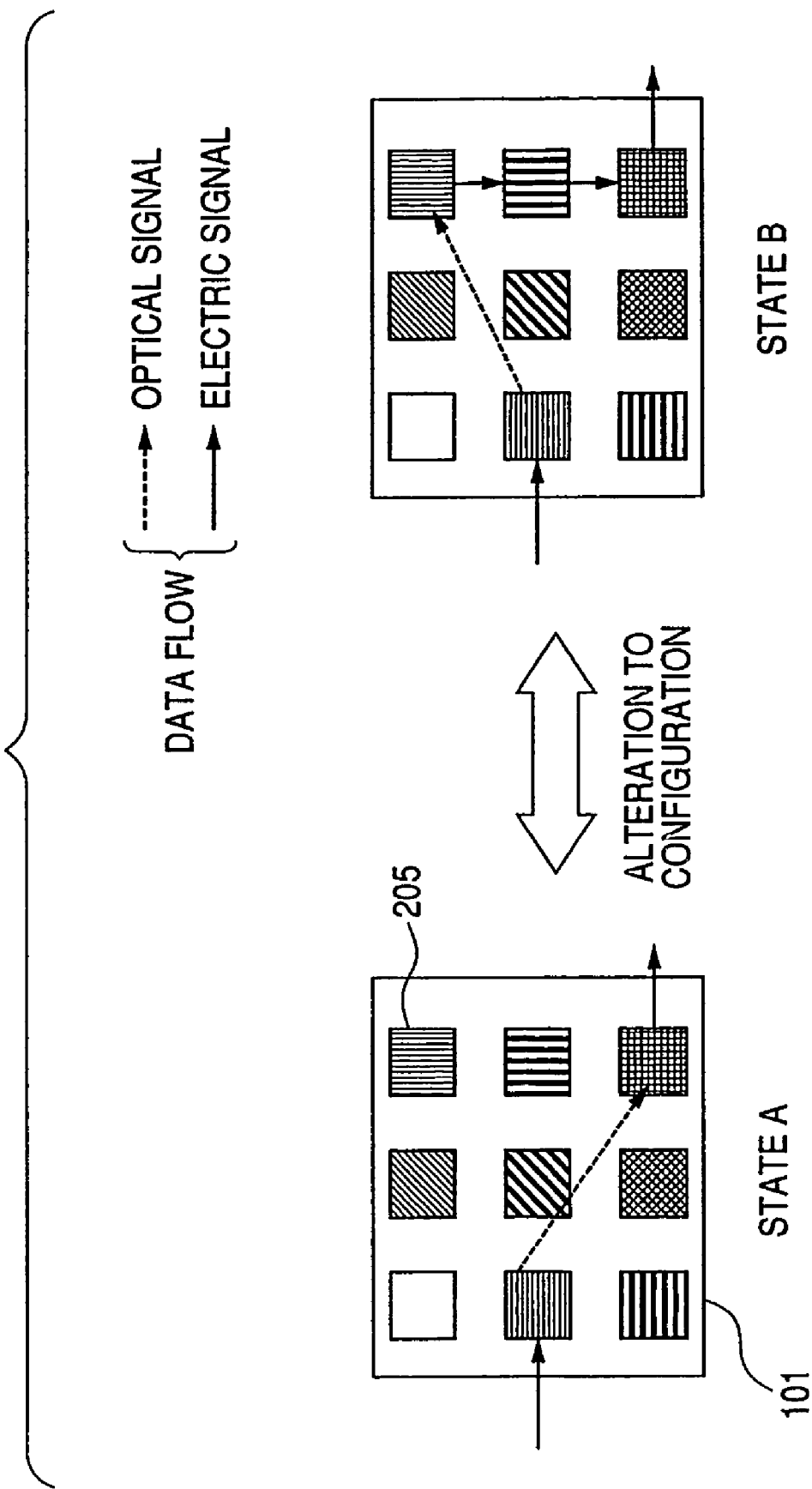
FIG. 4 is a schematic illustration of the reconfiguration of the optoelectronic circuit used in Example 2.

A reconfigurable circuit is formed in Example 2 by using a circuit board similar to that of Example 1. FIG. 4 is a schematic illustration of an exemplar circuit reconfiguration of the optoelectronic circuit of this example. A semiconductor chip having a reconfigurable electronic circuit in Example 1 corresponds to a logic block 205 in FIG. 4.

In FIG. 4, arrows with a dotted line indicate connections using the flexible optical circuit and those with a solid line indicate connections using electric wires. In this example, the flexible optical circuit is used for transferring data between logic blocks 205. As described below, the flow of data can be altered with an enhanced degree of freedom by altering the connections of the flexible optical circuit. Each of the logic blocks 205 is provided with a port adapted to transmit and receive light.

The circuit of this example is adapted to alter its internal structure, or reconfigure itself, as it transits from State A to State B in FIG. 4. In FIG. 4, the logic blocks 205 carry various patterns, which indicate that the circuits differ in terms of circuit configuration. Thus, the different pattern means that the different circuit is developed in the logic block. In this example, the circuit configuration of each of the logic blocks 205 is defined by externally loading configuration information in advance. In State A, a signal is externally input to the logic block [2, 1] and processed within the block. Thereafter, the data is transferred to the logic block [3, 3] by the flexible optical circuit and processed in the logic block before it is output. In State B, on the other hand, a signal is externally input to the logic block [2, 1] and output from the logic block [3, 3] as in the case of State A, although the signal passes through the logic blocks [1, 3] and [2, 3] in between. The signal is conveyed from the logic block [2, 1] to the logic block [1, 3] by way of the flexible optical circuit and from the logic block [1, 3] to the logic block [2, 3] and then to the logic block [3, 3] by way of electric wires.

A transition of state as described above is realized as configuration data (information on alterations of connections through the flexible optical circuit) is externally written into the memories annexed to the ports. Then, the ports alters the mode of transmission/reception of an optical signal according to the configuration information. In this example, a circuit is defined by using two logic blocks 205 in State A, whereas the functions of the logic blocks [1, 3] and [2, 3] are linearly added to the data flow in State B. In other words, the function of the circuit is expanded as a result of reconfiguration of the flexible optical circuit.

While only two states are involved in the above description, the number of states is not limited to two and the circuit can be reconfigured to any one of a number of states. For example, when two logic blocks are involved as in State A, a combination of any two logic blocks may be used for reconfiguration. Particularly, data can be optically transferred at high speed between logic blocks 205 that are separated from each other by a long distance. In a manner as described above, the optoelectronic circuit can change its function and one or more than one functions may be added to it by reconfiguring the data flow on a block by block basis. While nine logic blocks are shown in FIG. 4, the advantages of a flexible optical circuit can be boosted when the number of logic blocks is raised.

The internal configuration of each of the logic blocks 205 is predefined and fixed and only the third stratum that is the flexible optical circuit is reconfigured in this example. Such a reconfiguration can be realized relatively at high speed because the volume of necessary configuration data is small. While the internal configuration of each of the logic blocks 205 is fixed in the above description, the internal configuration can be externally rewritten if necessary for the purpose of version up of the system. In such an occasion, this example provides an advantage of raising the degree of freedom for designing a new program because the flexible optical circuit has a high degree of freedom of connections.

EXAMPLE 3

Figure 5:
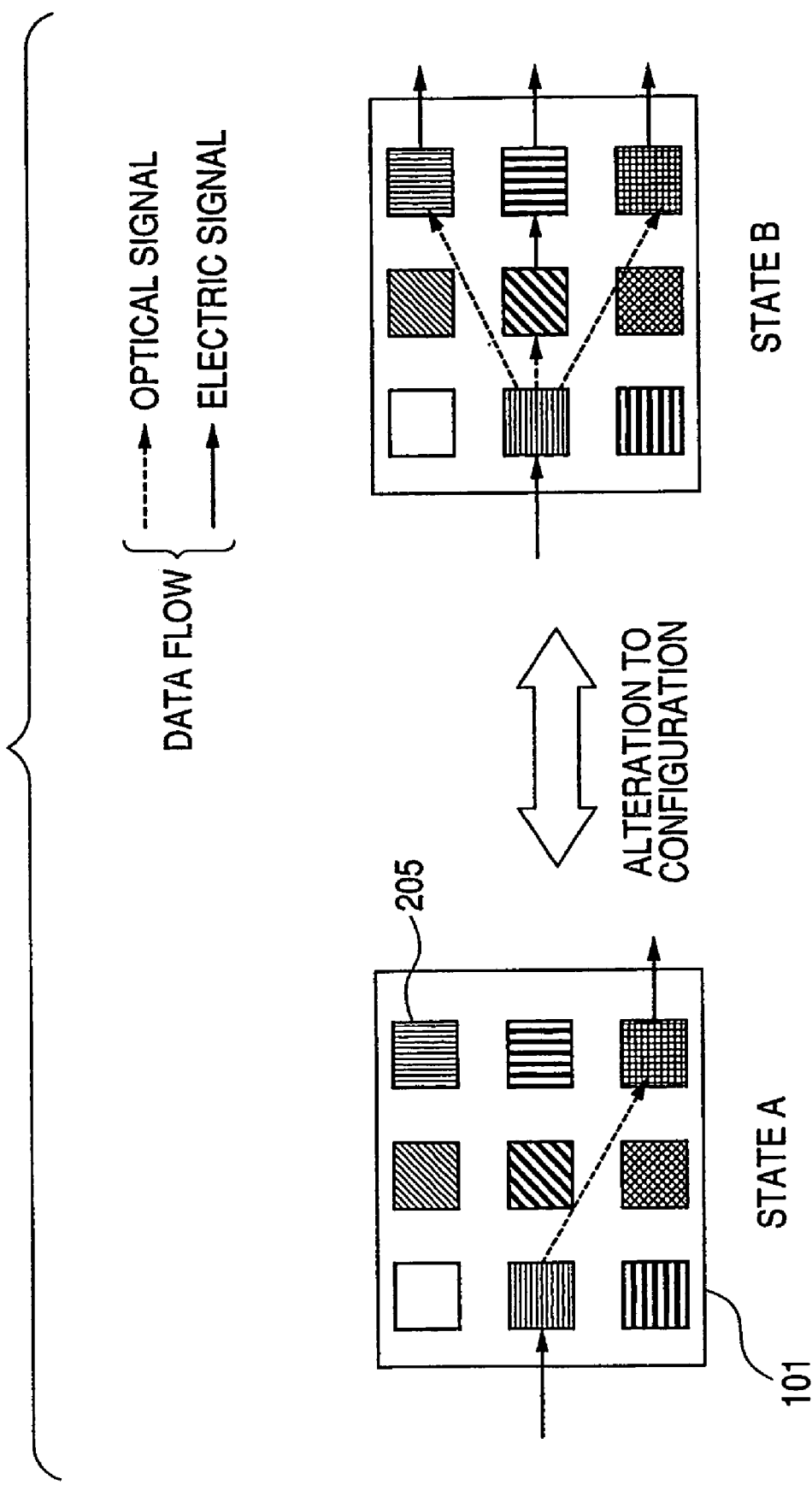
FIG. 5 is a schematic illustration of the reconfiguration of the optoelectronic circuit used in Example 3.

Example 3 is similar to Example 2 but the circuit is reconfigured by adding functions in parallel. FIG. 5 is a schematic illustration of an exemplar circuit reconfiguration of the optoelectronic circuit of this example. Each of the logic blocks is provided with a port adapted to transmit and receive light. It will be seen that long distance transmission and multicast using a flexible optical circuit are functioning.

Referring to FIG. 5, in State A, a signal is externally input to the logic block [2, 1] and processed within the block. Thereafter, the data is transferred to the logic block [3, 3] by the flexible optical circuit and processed in the logic block before it is output. In State B, on the other hand, a signal is externally input to the logic block [2, 1] and processed. Subsequently, the signal route is branched to path A getting to the logic block [1, 3], path B getting to logic block [2, 3] by way of logic block [2, 2] and path C getting to logic block [3, 3]. The flexible optical circuit is used for the transfer from the logic block [2, 1] to the logic block [1, 3], the transfer from the logic block [2, 1] to the logic block [3, 3] and the transfer from logic block [2, 1] to logic block [2, 2] and an electric wire is used for the transfer from the logic block [2, 2] to the logic block [2, 3].

A transition of state as described above is realized in this example by altering the interconnections of the related logic blocks 205 according to the control information such as addresses typically described in the header of the input signal. For example, the use of the flexible optical circuit or that of electric wires may be selected. Also, the radiation angle and the direction of radiation may be altered at the transmitting port. In this example, the logic block [2, 1] decodes the signal input to it and then selects propagation of a beam to the logic block [3, 3] (State A) or multicast toward the logic blocks [1, 3], [2, 2] and [3, 3] (State B). In other words, in this example, the flexible optical circuit is reconfigured by using the control information such as addresses described in the signal as configuration data. While the transmitting port makes the above described alterations in the above description, the optical signal may be diffused and propagated so that the receiving port can decide to acquire the transmitted data or not, according to whether it is State A or B.

Thus, in this example, while the path C is used in State A, the path A and the path B are added in parallel for the data flow in State B. In other words, functions are added as a result of reconfiguration of the flexible optical circuit. Again, the number of states is not limited to two. Thus, as in the case of Example 2, the optoelectronic circuit can change its function and one or more than one functions may be added to it by reconfiguring the data flow on a block by block basis. Particularly, multicast transmission, using the flexible optical circuit is effective when the application is provided with the feature of parallelism.

EXAMPLE 4

Figure 6:
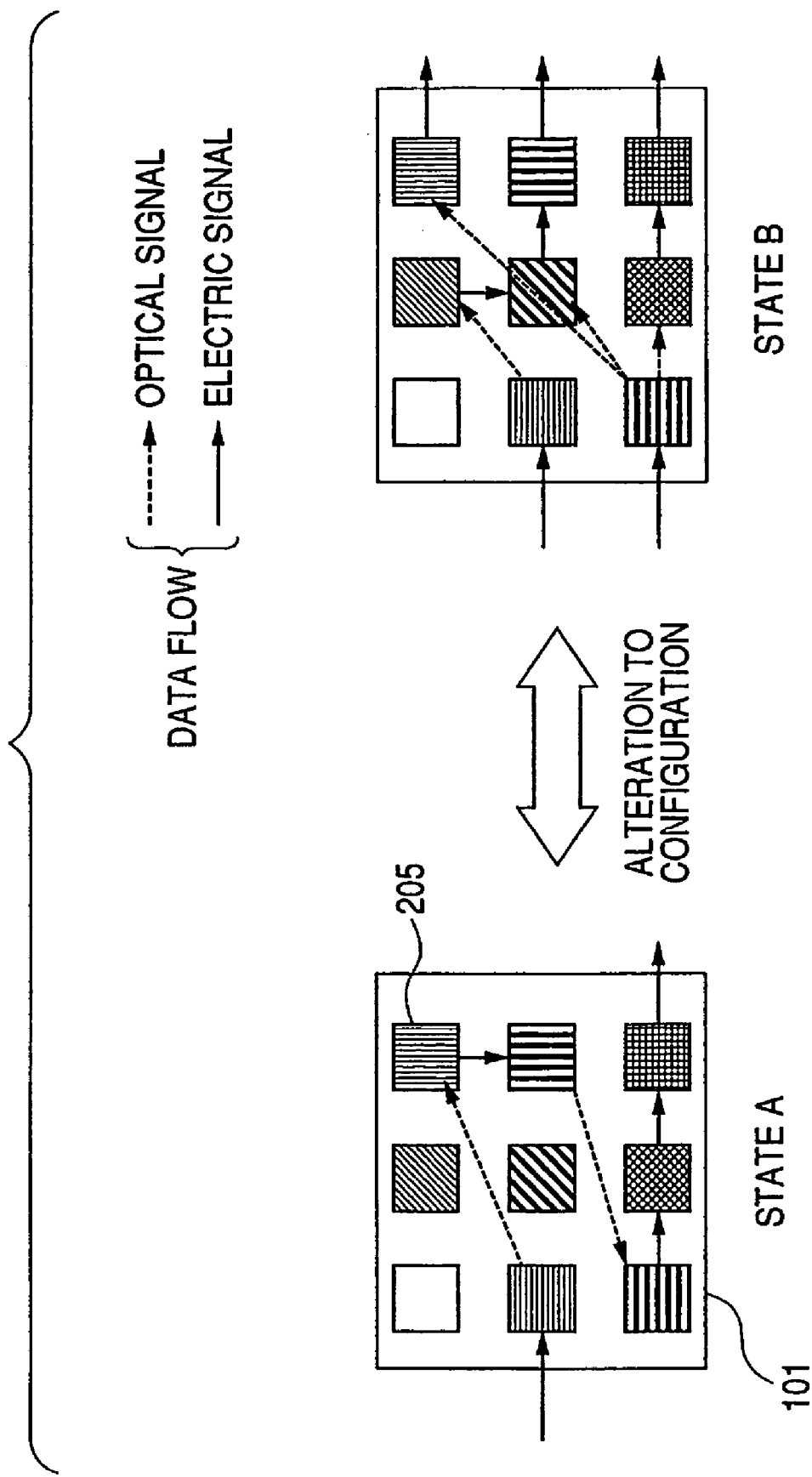
FIG. 6 is a schematic illustration of the reconfiguration of the optoelectronic circuit used in Example 4.

Example 4 is similar to Example 3 but involves more complex reconfigurations. FIG. 6 is a schematic illustration of an exemplar circuit reconfiguration of the optoelectronic circuit of this example. Each of the logic blocks is connected to a port adapted to transmit and receive light. It will be seen that long distance transmission and multicast using a flexible optical circuit are functioning.

Referring to FIG. 6, in State A, a signal is externally input to the logic block [2, 1] and output by way of the logic blocks [1, 3], [2, 3], [3, 1], [3, 2] and [3, 3]. On the other hand, in State B, a signal is externally input to the logic block [2, 1], while another signal is input to the logic block [3, 1]. The signal input to the logic block [2, 1] proceeds to the logic block [2, 2] by way of the logic block [1, 2]. The signal input to the logic block [3, 1] is multicast to the logic blocks [1, 3], [2, 2] and [3, 2]. While the signal to the logic block [1, 3] is output directly, the signal to the logic block [3, 2] proceeds to the logic block [3, 3], where it is output. On the other hand, in the logic block [2, 2] where the two signals arrive, an arithmetic processing operation is conducted by using the signals (e.g., a comparing operation) and the processed signals proceed to the logic block [2, 3], where they are output.

A transition of state as described above is realized in this example as configuration data is externally written into the memories annexed to the ports and to the logic blocks 205. As a result, each of the logic blocks decides to use electric wires or the flexible optical circuit for output and selects the direction and the angle of radiation of the optical output.

In this example, the serial circuit in State A is reconfigured to a parallel circuit in State B. Particularly, multicast transmission from the logic block [3, 1], using the flexible optical circuit makes a sophisticated reconfiguration feasible in this example. Moreover, in State B, arithmetic operations between branched data flows are made possible in the logic block [2, 2] in addition to parallelism. The number of states is not limited to two. Thus, in Example 4 again, the optoelectronic circuit can change its function and one or more than one functions may be added to it by reconfiguring the data flow on a block by block basis. Particularly, this circuit is a reconfigurable circuit that is highly advantageous in terms of parallelism.

EXAMPLE 5

Figure 7:
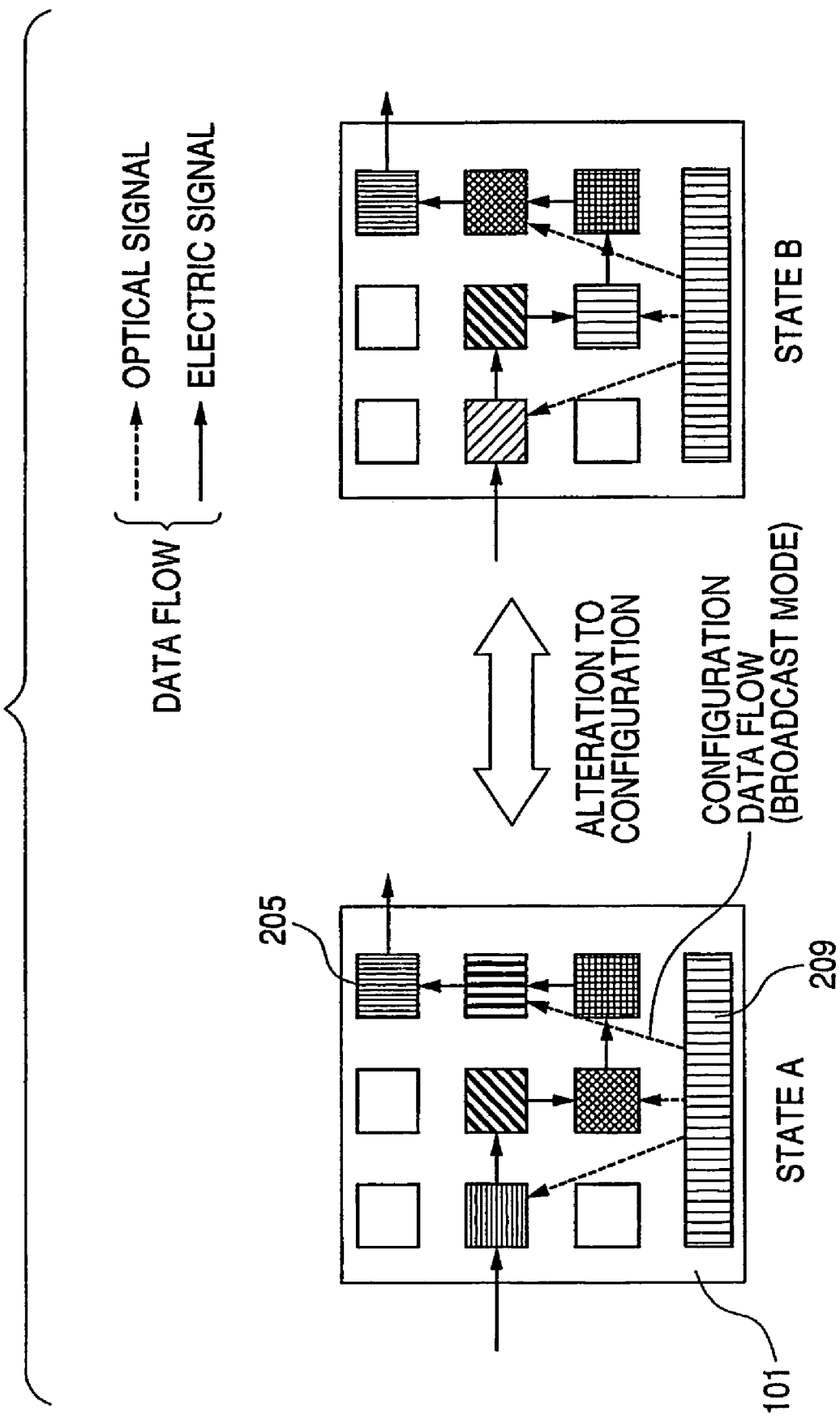
FIG. 7 is a schematic illustration of the reconfiguration of the optoelectronic circuit used in Example 5.

In Example 5, the configuration data in a logic block is distributed (multi-casted) by way of the flexible optical circuit. With this arrangement, the electronic circuit in each of the logic blocks can be altered with an enhanced degree of freedom according to the configuration data that are distributed by light. FIG. 7 is a schematic illustration of an exemplar circuit reconfiguration of the optoelectronic circuit of this example.

In the optoelectronic circuit of this example, the logic blocks comprise a memory block 209 in addition to the chips, and the memory block 209 supplies configuration data that corresponds to the internal configuration of each of the logic blocks 205. The memory block 209 may be a nonvolatile memory and appropriate ones of the configuration data stored there may be selectively used. The data stored in the volatile memory may be rewritten from time to time, while the system is being operated. The memory may be a flash memory, an EEPROM, a DRAM, an SRAM, an MRAM, an Fe-RAM or some other appropriate memory.

In this example, each of the logic blocks 205 is provided with a port dedicated to signal reception. A port connected to the memory block 209 is dedicated to signal transmission. As configuration data are loaded appropriately from the memory block 209 to a desired logic block 205, the electronic circuit in the latter is reconfigured. In FIG. 7, the change of graphical patterns of the logic blocks 205 indicates that the internal electronic circuits thereof are reconfigured. In both State A and State B, a signal is externally input to the logic block [2, 1] and output by way of the logic blocks [2, 2], [3, 2], [3, 3], [2, 3] and [1, 3]. In other words, the data flow among the logic blocks 205 does not change in response to a transition from State A to State B or vice versa in this example. Electric wires are used for the flow of data in this example, although the flexible optical circuit may be used as part of the flow of data.

Broadcast transmission is used for the purpose of transmission of configuration data so that the configuration data transmitted from the memory block 209 may be received at all the ports as optical signals. Since the data are transmitted in the form of packets and provided with addresses that corresponds to the logic blocks 205 so that the ports that correspond to the addresses can receive the configuration data.

It is not necessary to reconfigure all the logic blocks 205. In FIG. 7, only the logic blocks [2, 1], [3, 2] and [2, 3] are reconfigured. The dotted lines in FIG. 7 indicate the flows of configuration data. Since the flexible optical circuit can transmit information to the desired logic blocks 205 by changing the address of the packets, the arrangement of this example functions effectively for such a partial reconfiguration.

Thus, under the constant data flow, the optoelectronic circuit can be reconfigured by way of transmission/reception of configuration data, using the flexible optical circuit. Particularly, since the flexible optical circuit is adapted to broadcast and multicast, the arrangement of this example is useful when rewriting the configuration data of a plurality of logic blocks 205 and also when the configuration data need to be partly rewritten. Configuration data can be optically transmitted at high speed to logic blocks 205 that are separated by a long distance if the number of logic blocks is large.

The optoelectronic circuit of this example is adapted to distribute configuration data by using the third stratum and reconfigure the internal configuration of at least either the first stratum or the second stratum. Thus, the arrangement of this example can be used to transmit either the configuration data of the first stratum or those of the second stratum by way of the third stratum.

EXAMPLE 6

As in the case of Example 5, the flexible optical circuit of this example is used to distribute the configuration data of any of the logic blocks 205. In this example, the data flow among the logic blocks 205 is also reconfigured. As in the case of Example 5, the configuration of the electronic circuit in each of the logic blocks 205 can be reconfigured according to the configuration data from the memory block 209. In this example again, each of the logic blocks 205 is connected to a port adapted to transmission/reception. As seen from FIG. 8, the flexible optical circuit is applied to interconnections of the logic blocks 205 and the data flow among the logic blocks 205 is also reconfigured.

Figure 8:
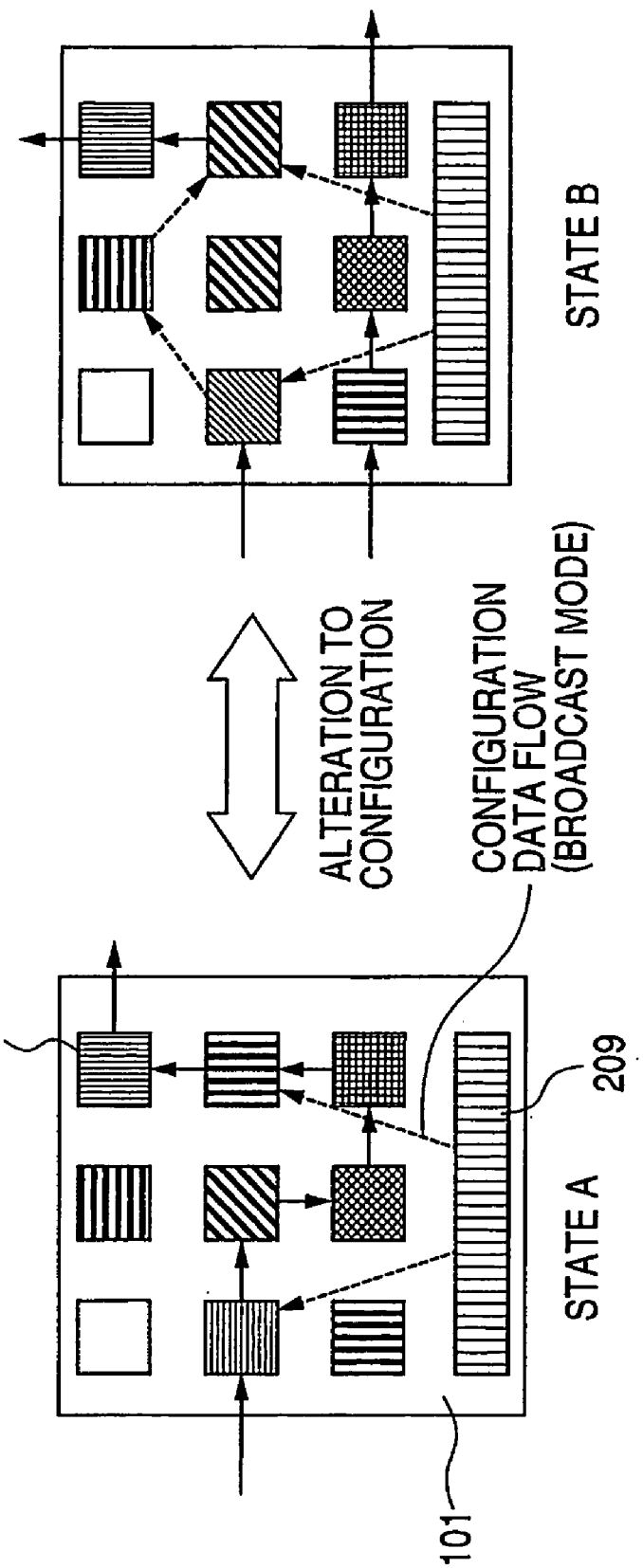
FIG. 8 is a schematic illustration of the reconfiguration of the optoelectronic circuit used in Example 6.

Referring to FIG. 8, State A involves a single input and a single output so that the signal input to the logic block [2, 1] is output from the logic block [1, 3] by way of six logic blocks (path A). On the other hand, State B involves two inputs and two outputs so that the signal input to the logic block [2, 1] is output from the logic block [1, 3] by way of four logic blocks (path A'). Apart from this, there is formed a path B for a signal input to the logic block [3, 1] and output from the logic block [3, 3]. In other words, in this example, a new function (path B) is inserted into the optoelectronic circuit depending on transition of state and the original function is diminished from the path A to the path A'.

In this example again, configuration data is distributed from the memory block 209 by using the flexible optical circuit. Note, however, electric wires may be used partly for moving configuration data. The connection in any of the logic blocks 205 and the interconnections of the logic blocks 205 can be freely altered (reconfigured) according to the configuration data. In other words, all the stratums including the first, second and third stratums are used for reconfiguration in this example. Note that only some of the logic blocks 205 (only the logic blocks [2, 1] and [2, 3]) are reconfigured in this example. Such a partial reconfiguration can be conducted at high speed because the necessary volume of configuration data is small.

EXAMPLE 7

Configuration data are stored solely in a memory block 209 that is provided in addition to the logic blocks 205 in both Example 5 and Example 6. In Example 7, configuration data are distributed among and stored in the logic blocks 205 with memory. Each of the LSI chips comprises a memory section 210 in addition to a logic block 205 (logic section 211) for storing configuration data that correspond to the internal configuration of the logic block. Additionally, each of the logic blocks can move, copy and/or replace desired configuration data from any of the other logic blocks by way of optical connections. At this time, each of the memory sections 210 always stores configuration data that corresponds to the circuit being developed in the logic block.

Figure 9:
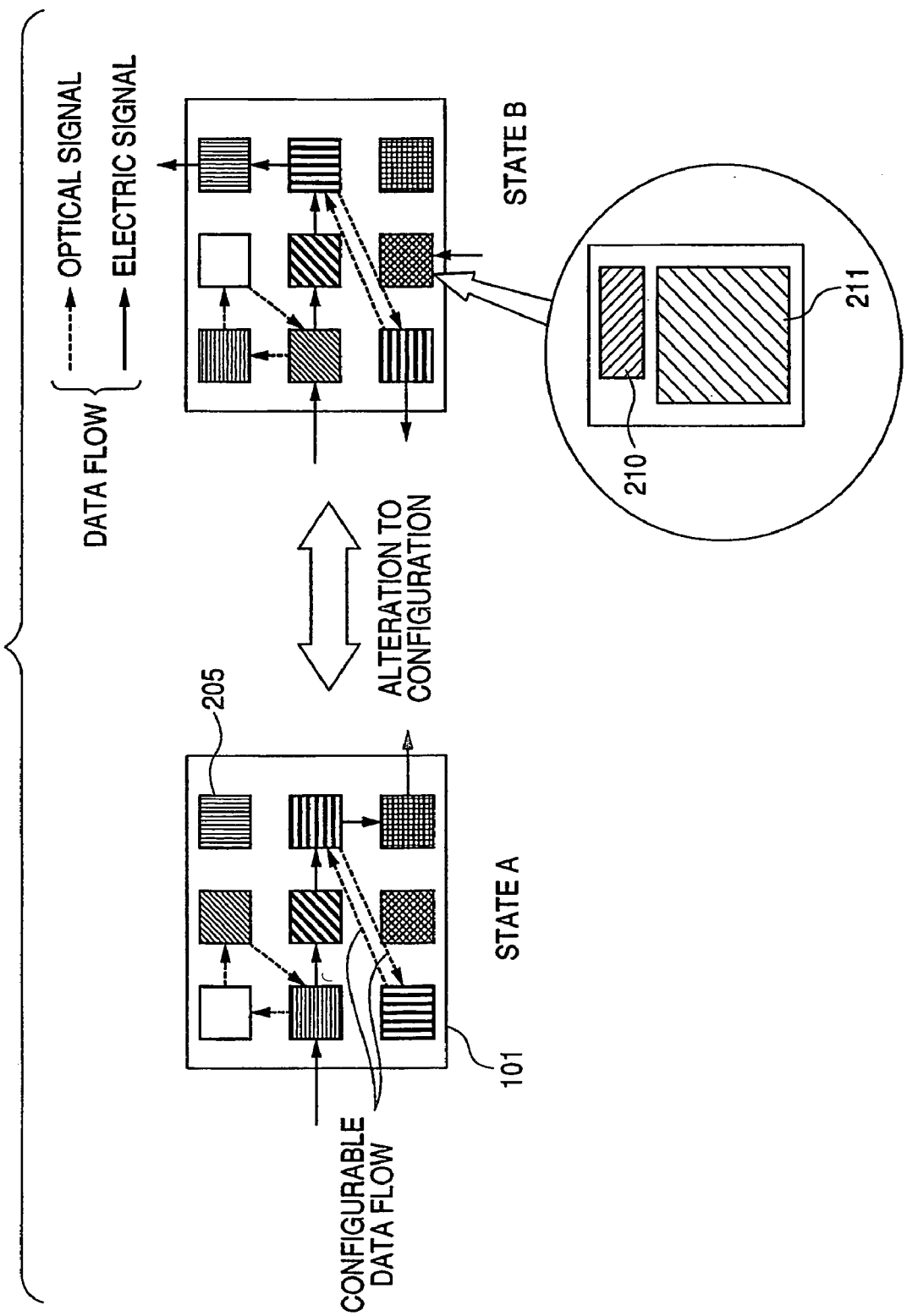
FIG. 9 is a schematic illustration of the reconfiguration of the optoelectronic circuit used in Example 7.

Referring to FIG. 9, sequential transition of configuration data takes place among the logic blocks [1, 1], [1, 2] and [2, 1] and, at the same time, the configuration of the electronic circuit in each of the blocks changes. Additionally, replacement of configuration data takes place between the logic block [2, 3] and the logic block [3, 1] and also that of the configuration of the electronic circuits of the logic blocks also occurs. Again, the number of states is not limited to two. In the instance of FIG. 9, transitions of 2×3 or 6 states is possible.

With this technique, it is possible to realize various reconfigurations by moving, copying and/or replacing configuration data among the logic blocks without externally loading information. Moving and copying can be realized simultaneously by multicast.

In the instance of FIG. 9, electric wires are used for the flow of data and the flexible optical circuit is used for moving configuration data. However, inversely, the flexible optical circuit may alternatively be used for the flow of data and electric wires may alternatively be used for moving configuration data. In the case of replacement, the process of replacement proceeds smoothly when a vacant logic block is additionally provided so that configuration data and the configuration of the electronic circuit are temporarily shunted there. In other words, configuration data can be moved smoothly when one of the logic blocks is designed to operate as buffer for configuration data.

In this example, the degree of freedom for moving, replacing and/or copying configuration data is remarkably improved by using the flexible optical circuit. Particularly, configuration data can be moved, replaced and/or copied at high speed between logic blocks that are separated from each other by a long distance. This advantage is particularly remarkable when the number of logic blocks is large.

The arrangement of this example can be defined as a circuit reconfiguration technique that utilizes the third stratum. This technique is characterized by an enhanced degree of freedom for reconfiguration and the capability of high-speed partial reconfiguration. It is effective for circuits that are to be reconfigured continuously on a time series basis such as real time control systems.

EXAMPLE 8

Figure 10:
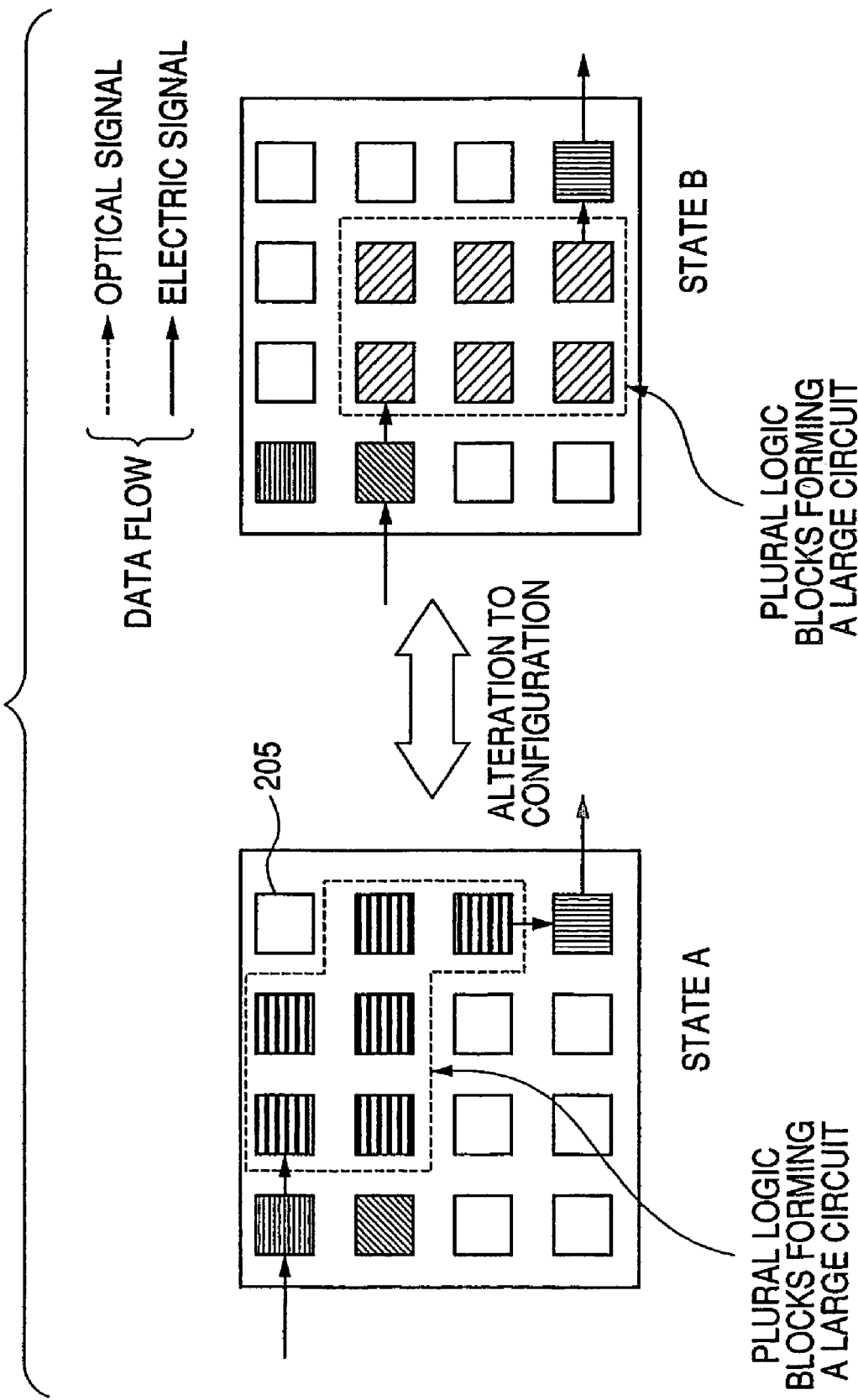
FIG. 10 is a schematic illustration of the reconfiguration of the optoelectronic circuit used in Example 8.

In Example 8, a plurality of logic blocks 205 are reconfigured as a single large circuit. FIG. 10 schematically illustrates a reconfiguration of this example. The optoelectronic circuit of FIG. 10 comprises 4×4=16 logic blocks. In this example, four ports adapted to data transmission/reception are connected to each of the logic blocks 205. The degree of freedom of connection among the logic blocks 205 is raised to facilitate the operation of designing a large circuit comprising a plurality of logic blocks when a number of ports are available to each logic block.

A signal is input to the logic block [1, 1] and output from the logic block [4, 4] in State A of FIG. 10. Referring to FIG. 10, the logic blocks surrounded by broken lines operate together as a large circuit in State A. The logic blocks of the large circuit are interconnected by electric wires and/or the flexible optical circuit. In State B, a signal is input to another logic block, or the logic block [2, 1] and output from the logic block [4, 4]. Here again, the logic blocks surrounded by broken lines operate together as a large circuit. The logic blocks of the large circuit are interconnected by electric wires and/or the flexible optical circuit.

The function of the large circuit formed by the logic blocks surrounded by broken lines in State A and that of the large circuit formed by the logic blocks surrounded by broken lines in State B are same and identical. However, the two large circuits differ from each other in terms of size and shape because of the difference of input section. In other words, they differ from each other in terms of arrangement, wiring and hence circuit configuration, although they functions same. Transition from State A to State B and vice versa takes place when signal input is switched from the logic block [1, 1] to the logic block [2, 1] and vice versa. At this time, a flag signal for circuit reconfiguration is issued and broadcast from one of the ports connected to the logic block that operates as input section by using the flexible optical circuit. Then, each of the related logic blocks 205 proceeds to internal reconfiguration using the reception of the flag signal as trigger. With this technique, transition from a state to another (reconfiguration) occurs smoothly in response to a command from the logic block 205 to which information is input.

An enhanced degree of freedom is provided for interconnections among the logic blocks because the optoelectronic circuit of this example also has a flexible optical circuit. Thus, in the optoelectronic circuit, small alteration in any of the logic blocks can lead to effective functional alteration. Also, an enhanced degree of freedom for designing is realized.

EXAMPLE 9

Figure 11:
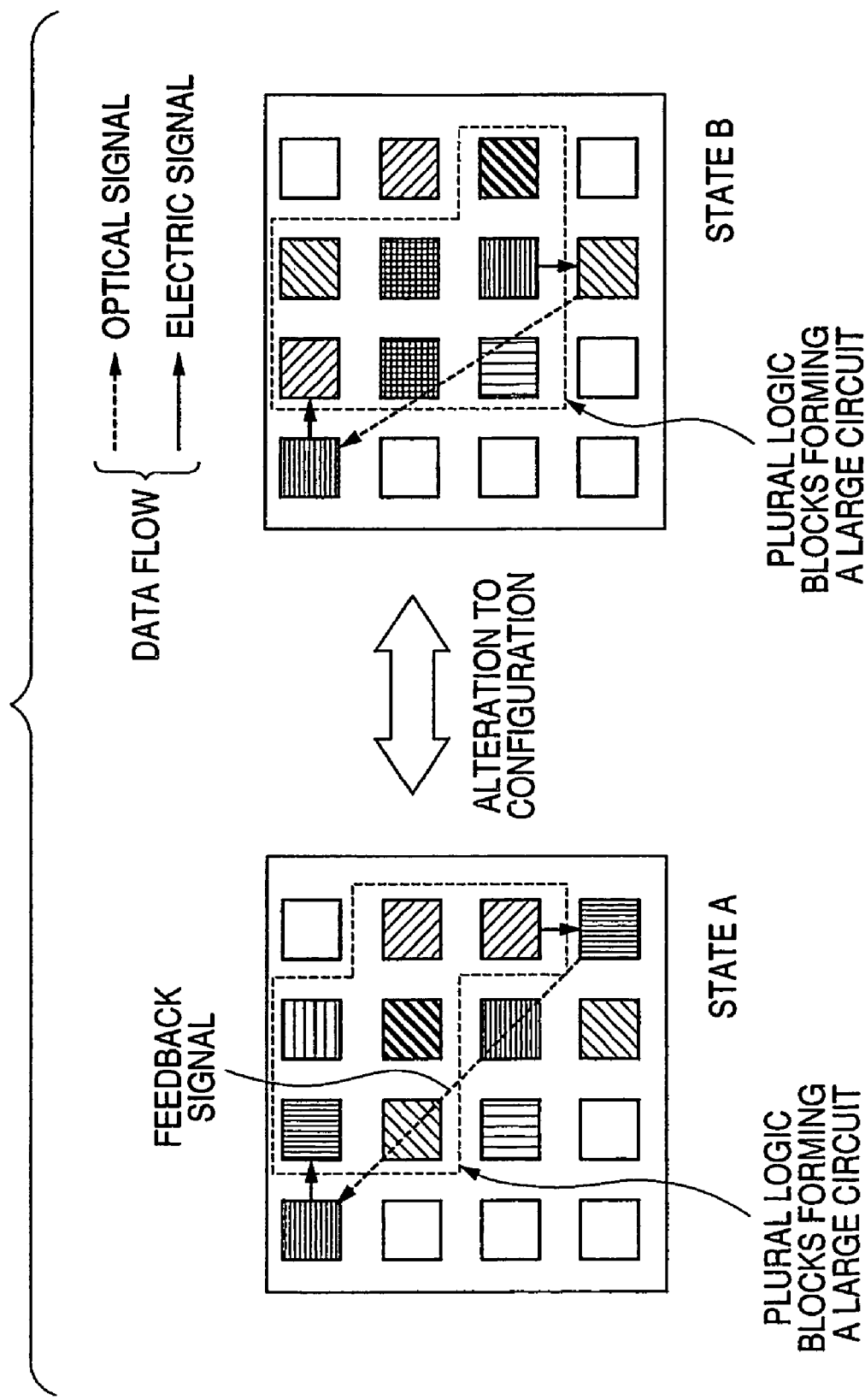
FIG. 11 is a schematic illustration of the reconfiguration of the optoelectronic circuit used in Example 9.

In this example again, a large circuit is reconfigured by using a plurality of logic blocks as shown in FIG. 11. However, unlike Example 8, the circuit configuration surrounded by broken lines is altered and the function is changed. The optoelectronic circuit of this example comprises 4×4=16 logic blocks, as shown in FIG. 11. A total of five ports adapted to data transmission/reception are arranged at the four corners and at the center respectively. Each of the ports is connected to a plurality of logic blocks 205 located in the vicinity so as to be shared by the latter.

With this arrangement where a plurality of logic blocks 205 share a single port, the number of ports necessary for the optoelectronic circuit is reduced and hence the configuration of the flexible optical circuit is simplified.

In both State A and State B of this example, the data that is processed and output is fed back to the input section as shown in FIG. 11. The flexible optical circuit is positively used for the transmission, or feedback, of the data. As the data passes through a plurality of logic blocks 205 as it is processed, the input section and the output section can be separated from each other by a long distance. Then, the feedback will require a long route. Therefore, the use of the flexible optical circuit is preferable for the route of the feedback. At the time of the feedback, a flag signal indicating the feedback can be broadcast to all the logic blocks. The use of the flexible optical circuit is advantageous for such a broadcast. Each of the related logic blocks 205 reconfigures the internal circuit in response to the flag signal. In this example, each of the logic element in each of the logic blocks has a memory that stores a plurality of configuration data of the logic element. Each of the logic blocks is internally reconfigured as the function of the logic element is altered in response to the trigger of the flag signal. In this way, a reconfiguration automatically takes place to move into the next state according to the flow of data.

With the above-described technique, the electronic circuit of each of the logic blocks is reconfigured in response to each feedback. In other words, the circuit operates as a different circuit in response to each feedback. Therefore, a large program can be executed by sequentially switching small reconfigurable circuits.

EXAMPLE 10

Figure 12:
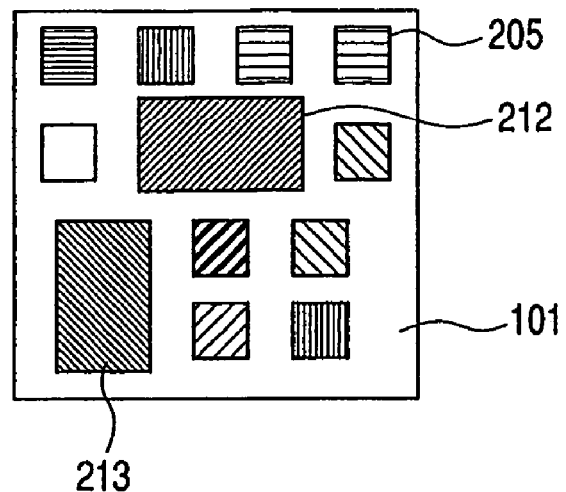
FIG. 12 is a schematic plan view of the configuration of the optoelectronic circuit comprising an ASIC and memory used in Example 10.

The optoelectronic circuit of Example 10 is mounted with chips of different types along with a plurality of logic blocks 205. FIG. 12 is a schematic illustration of an optoelectronic circuit mounted with an ASIC (application specific integrated circuit) 212 and a memory chip 213 along with a plurality of logic blocks 205. Referring to FIG. 12, the logic blocks 205, the ASIC 212 and the memory 213 can be connected freely and the connections thereof can be altered (reconfigured) by means of the flexible optical circuit and ports.

With this arrangement, the entire circuit can be reconfigured freely by internally reconfiguring the related logic blocks 205 and altering the interconnections of the devices. Normally, the existence of an ASIC whose internal circuit is fixed can make any reconfiguration of the entire circuit difficult. However, the possibility of reconfiguration is remarkably improved when a flexible optical circuit is used. Since the flexible optical circuit is free from restrictions relative to the positions of the ports in such a system, the system has a large positional tolerance for the arrangement of the electric pins of the ASIC 212 and the memory 213.

In the electrical interconnection, the positional arrangement and the connections of the ASIC and the other additional device can be subjected to restrictions depending on the profiles of chips, pin arrangement, etc. However, the circuit can be designed flexibly with a high degree of redundancy when a flexible optical circuit is used. Then, the customized devices including the ASIC can be designed without difficulty so as to improve their performances. In short, the optoelectronic circuit of this example enables customized and reconfigurable circuit showing a high degree of redundancy and high performance.

EXAMPLE 11

The configuration of the optoelectronic circuit of this example resembles that of Example 1 but differs from the latter in that a processor array is used for the logic blocks. Each logic block comprises logic elements, each being formed by a 32-bit arithmetic unit with an operation frequency of 100 MHz and a 8 KB memory for holding data. A total of 12×12=144 logic elements are arranged. The arithmetic units are connected by an interconnection network formed by a matrix of wires and switches. A total of 3×3=9 logic blocks are arranged. Thus, the optoelectronic circuit of this example is a data-flow type multi-processor where the processors are interconnected by way of a flexible optical circuit comprising a two-dimensional optical waveguide and electric wires. It is possible to transmit instruction sets, control signals, interrupt signals and so on in addition to data signals by means of the flexible optical circuit.

The reconfigurable optoelectronic circuit of this example is adapted to high speed processing, using a plurality of processors for parallel processing. Additionally, the processor elements can be electrically interconnected by means of programmable switches and also by means of a flexible optical circuit. Therefore, processor elements can be interconnected freely in a desired way to realize an efficient data flow depending on the application of the optoelectronic circuit.

EFFECT OF THE INVENTION

As described above in detail, according to the invention, there is provided a reconfigurable optoelectronic circuit that is large scale and operates at high speed.

The invention claimed is:

1. A reconfigurable optoelectronic circuit having an alterable internal configuration, comprising a plurality of logic blocks and a sheet-shaped optical transmission medium interconnecting the logic blocks,
    wherein each of the logic blocks has an alterable internal configuration including a plurality of logic elements selectively connected via electric wires and switches such that the connection of the logic elements can be switched,
    wherein each of the logic elements has an alterable internal configuration,
    and wherein the interconnection of the logic blocks via the optical transmission medium is alterable.

2. A circuit according to claim 1, wherein configuration data of the circuit are distributed by way of said optical transmission medium and the alterable internal configuration of any of the logic blocks is altered according to the configuration data.

3. A circuit according to claim 1, wherein each of said logic blocks comprises a variable logic section and a memory section and the memory section holds configuration data that corresponds to the alterable internal configuration of the variable logic section.

4. A circuit according to claim 3, wherein said logic block are adapted to move, copy and/or replace the alterable internal configuration of some other logic block by way of the optical transmission medium.

* * * * *

UNITED STATES PATENT AND TRADEMARK OFFICE
CERTIFICATE OF CORRECTION

PATENT NO. : 7,200,293 B2
APPLICATION NO. : 10/530188
DATED : April 3, 2007
INVENTOR(S) : Iwasaki It is certified that error appears in the above-identified patent and that said Letters Patent is hereby corrected as shown below:

COLUMN 13:
Line 67, "predefined" should read -- predefined 270 --.

COLUMN 22:
Line 61 claim 4, "block" should read -- blocks --.

Signed and Sealed this

Eighteenth Day of March, 2008

JON W. DUDAS
*Director of the United States Patent and Trademark Office*